US008253618B2

(12) United States Patent
Sunaga et al.

(10) Patent No.: US 8,253,618 B2
(45) Date of Patent: Aug. 28, 2012

(54) REMOTE CONTROLLER

(75) Inventors: Tadaharu Sunaga, Neyagawa (JP); Naoki Hamada, Neyagawa (JP); Yoshimichi Kawata, Neyagawa (JP); Takumi Tanaka, Neyagawa (JP); Hiroyuki Fukuma, Neyagawa (JP)

(73) Assignee: Onkyo Corporation, Osaka (JP)

( * ) Notice: Subject to any disclaimer, the term of this patent is extended or adjusted under 35 U.S.C. 154(b) by 382 days.

(21) Appl. No.: 12/711,343

(22) Filed: Feb. 24, 2010

(65) Prior Publication Data

US 2010/0238062 A1 Sep. 23, 2010

(30) Foreign Application Priority Data

Mar. 17, 2009 (JP) ................................ 2009-63702
Mar. 17, 2009 (JP) ................................ 2009-63703

(51) Int. Cl.
*H04L 17/02* (2006.01)

(52) U.S. Cl. .................. 341/176; 340/12.22; 340/12.23

(58) Field of Classification Search .................. 341/176; 340/12.22, 12.23
See application file for complete search history.

(56) References Cited

U.S. PATENT DOCUMENTS

| | | | | |
|---|---|---|---|---|
| 6,567,011 | B1 * | 5/2003 | Young et al. | 340/12.28 |
| 7,116,264 | B2 * | 10/2006 | Griesau et al. | 341/176 |
| 7,230,563 | B2 * | 6/2007 | Vidal | 341/176 |
| 7,460,050 | B2 * | 12/2008 | Alvarado et al. | 341/176 |
| 8,054,211 | B2 * | 11/2011 | Vidal | 341/176 |
| 2002/0101357 | A1 | 8/2002 | Gharapetian | |
| 2003/0234737 | A1 | 12/2003 | Nelson et al. | |
| 2006/0279430 | A1 | 12/2006 | Arai | |
| 2007/0223048 | A1 | 9/2007 | Misawa et al. | |

FOREIGN PATENT DOCUMENTS

| | | |
|---|---|---|
| JP | 05-014976 | 1/1993 |
| JP | 05-122779 | 5/1993 |
| JP | 06-133374 | 5/1994 |
| JP | 08-237751 | 9/1996 |
| JP | 11-075270 | 3/1999 |
| JP | 2001-242995 | 9/2001 |
| JP | 2002-345060 | 11/2002 |
| JP | 2003-087880 | 3/2003 |
| JP | 2006-014013 | 1/2006 |
| JP | 2006-129150 | 5/2006 |
| JP | 2007-013930 | 1/2007 |
| JP | 2007-124544 | 5/2007 |
| JP | 2007-228520 | 9/2007 |

(Continued)

*Primary Examiner* — Khai M Nguyen
(74) *Attorney, Agent, or Firm* — Renner, Otto, Boisselle & Sklar, LLP

(57) ABSTRACT

A remote controller is provided with: at least one first input unit that macro-controls predetermined remotely controlled devices including signal source devices; a plurality of second input units that select the signal source devices; a memory unit that stores a plurality of remote control codes for remotely controlling the remotely controlled devices; a transmitting unit that externally transmits the remote control codes; and a control unit that, when the first input unit is operated, outputs the remote control codes for remotely controlling the plurality of remotely controlled devices to the transmitting unit, and causes the transmitting unit to externally transmit the codes, wherein when the first input unit and one of the second input units are operated in a predetermined manner, a signal source device to be remotely controlled by the first input unit is changed to a signal source device that has been selected by the operated one of the second input units.

7 Claims, 23 Drawing Sheets

FOREIGN PATENT DOCUMENTS

| | | | |
|---|---|---|---|
| JP | 2007-259329 | | 10/2007 |
| WO | 01/69567 | | 9/2001 |
| WO | 02/31978 | | 4/2002 |
| WO | 02/054225 | A1 | 7/2002 |
| WO | 02/089086 | | 11/2002 |
| WO | 2006/038161 | A1 | 4/2006 |

* cited by examiner

FIG. 3 macro-control process sequences

| | key code |
|---|---|
| 1 | display mode key |
| 2 | power-on key |
| 3 | mode switching key for a signal source device |
| 4 | power-on key |
| 5 | AV receiver mode key |
| 6 | power-on key |

FIG. 4A macro-control process sequences A

| | key code |
|---|---|
| 1 | display mode key |
| 2 | power-on key |
| 3 | *DVD mode key* |
| 4 | power-on key |
| 5 | AV receiver mode key |
| 6 | power-on key |

FIG. 4B macro-control process sequences B

| | key code |
|---|---|
| 1 | display mode key |
| 2 | power-on key |
| 3 | *set-top box mode key* |
| 4 | power-on key |
| 5 | AV receiver mode key |
| 6 | power-on key |

FIG. 4C macro-control process sequences C

| | key code |
|---|---|
| 1 | display mode key |
| 2 | — |
| 3 | *CD mode key* |
| 4 | power-on key |
| 5 | AV receiver mode key |
| 6 | power-on key |

FIG. 5

Operation history table

| key code |
|---|
| “My Movie” key |

FIG. 6

All-off operation process sequences

| | key code |
|---|---|
| 1 | AV receiver mode key |
| 2 | power-off key |
| 3 | display mode key |
| 4 | power-off key |
| 5 | mode switching key for a signal source device |
| 6 | power-off key |

FIG. 10A

All-off operation process sequences A

| | key code |
|---|---|
| 1 | AV receiver mode key |
| 2 | power-off key |
| 3 | display mode key |
| 4 | power-off key |
| 5 | *DVD mode key* |
| 6 | power-off key |

FIG. 10B

All-off operation process sequences B

| | key code |
|---|---|
| 1 | AV receiver mode key |
| 2 | power-off key |
| 3 | display mode key |
| 4 | power-off key |
| 5 | *set-top box mode key* |
| 6 | power-off key |

FIG. 10C

All-off operation process sequences C

| | key code |
|---|---|
| 1 | AV receiver mode key |
| 2 | power-off key |
| 3 | display mode key |
| 4 | — |
| 5 | *CD mode key* |
| 6 | power-off key |

FIG. 14 macro-control process sequences

| | key code |
|---|---|
| 1 | display mode key |
| 2 | power-on key |
| 3 | signal source device mode key |
| 4 | power-on key |
| 5 | AV receiver mode key |
| 6 | power-on key |
| 8 | signal source device mode key |
| 9 | playback mode key |

FIG. 15 macro-control process sequences

| | key code |
|---|---|
| 1 | display mode key |
| 2 | power-on key |
| 3 | *DVD mode key* |
| 4 | power-on key |
| 5 | AV receiver mode key |
| 6 | power-on key |
| 8 | *DVD mode key* |
| 9 | playback mode key |

FIG. 18 macro-control process sequences

| | key code |
|---|---|
| 1 | display mode key |
| 2 | power-on key |
| 3 | *VCR mode key* |
| 4 | power-on key |
| 5 | AV receiver mode key |
| 6 | power-on key |
| 8 | *VCR mode key* |
| 9 | playback mode key |

FIG. 20

All-off operation process sequences

| | key code |
|---|---|
| 1 | AV receiver mode key |
| 2 | power-off key |
| 3 | display mode key |
| 4 | power-off key |
| 5 | *DVD mode key* |
| 6 | power-off key |

FIG. 23

All-off operation process sequences

| | key code |
|---|---|
| 1 | AV receiver mode key |
| 2 | power-off key |
| 3 | display mode key |
| 4 | power-off key |
| 5 | *VCR mode key* |
| 6 | power-off key |

REMOTE CONTROLLER

BACKGROUND OF THE INVENTION

1. Field of the Invention

The present invention relates to remote controllers, and in particular to a remote controller capable of macro-controlling to carry out a plurality of remote control operations to one or more remotely controlled devices with a single key operation.

2. Description of the Related Art

In an audio-visual system that is constituted by an audio-visual receiver, a DVD player, a CD player, a display, and such, these remotely controlled devices that constitute the system can be remotely controlled by a remote controller. One such remote controller has a macro-control function. With the macro-control function, it is possible to carry out predetermined remote operations to the remotely controlled devices with a single (or a very few number of times, such as twice in some cases) key operation using the remote controller, and a user can register a desired remote control processing to the remote controller. The macro-control function can carry out macro-control operations such as (a) an all-on operation for turning on power of a plurality of remotely controlled devices at the same time, (b) an all-off operation for turning off power of a plurality of remotely controlled devices at the same time, and (c) a series of operations carried out in order to view and listen to a specific signal source, for example, a DVD (Digital Versatile Disc), of turning on power of an audio-visual receiver, a DVD player, and a display, of switching an input selector of the audio-visual receiver to the DVD player, and of causing the DVD player to carry out a playback operation.

However, many of the remotely controlled devices that are commonly used in these days are designed to use a single power on/off remote control code and carry out a toggle operation of toggling between on and off of power every time when the remote control code is received. The toggle operation refers herein to an operation of toggling through a plurality of control states in rotation every time when the single remote control code is received. In other words, the same remote control code for power-supply control is used for both power-on and power-off, and a remotely controlled device switches the power status alternately between on and off every time when the remote control code for power-supply control is received from the remote controller. When the remote controller carries out an all-off operation to such a remotely controlled device that carries out the toggle operation of power, a remotely controlled device in the power-off state can be adversely turned on.

The above problem can be solved if a remotely controlled device is provided with remote control codes that respectively correspond to all control states. In other words, if a remote control code for power-on and a remote control code for power-off are different, a remotely controlled device in the power-on state maintains the power-on state after receiving the remote control code for power-on, and this does not present any disadvantage. However, assigning an independent remote control code for each control state of a remotely controlled device is not a very down-to-earth idea due to insufficient resources for remote control codes whose code length is limited. In addition, increasing a number of the remote control codes poses a problem such as a possible increase in a number of buttons provided on a remote controller or in a load to a control unit of the remote controller.

Further, in order to macro-control a series of operations such as the operation (c) as described above, the user must previously register, as a macro-control operation, a series of remote operations that the user wishes the remote controller to learn to a macro-control key on the remote controller. At this time, the user must manually carry out a series of key operations that are the same as the macro-control operation that the user wants the remote controller to learn. This makes the registration of the macro-control operation extremely cumbersome for the user. In order to solve this problem, some remote controllers are registered with commonly used macro-control operations previously at the time of manufacturing. However, a use environment in which the user uses an audio-visual system can be different from user to user. Accordingly, in a case in which a previously registered macro-control operation is not suited for the user, a problem still remains that the user must after all manually carry out all of the key operations that are the same as the macro-control operation that the user wants the remote controller to learn, even if the modification is necessary only to apart of the remote operation.

SUMMARY OF THE INVENTION

A remote controller according to the present invention is provided with: at least one first input unit that macro-controls predetermined remotely controlled devices including signal source devices; a plurality of second input units that select the signal source devices; a memory unit that stores a plurality of remote control codes for remotely controlling the remotely controlled devices; a transmitting unit that externally transmits the remote control codes; and a control unit that, when the first input unit is operated, outputs the remote control codes for remotely controlling the plurality of remotely controlled devices to the transmitting unit, and causes the transmitting unit to externally transmit the codes, wherein when the first input unit and one of the second input units are operated in a predetermined manner, the signal source device to be remotely controlled by the first input unit is changed to the signal source device that has been selected by the operated one of the second input units.

When the first input unit for macro-controlling the plurality of remotely controlled devices including the signal source device and the one of the second input units for selecting the signal source devices are operated in the predetermined manner, the signal source device to be remotely controlled by the first input unit is changed to the signal source device that has been selected by the operated one of the second input units. With this, if a user wishes to change only a signal source device to be remotely controlled by a macro-control operation, it is possible to change the signal source device to be remotely controlled with a simple operation.

In the preferred embodiment of the present invention, said memory unit further stores a macro-control process sequence that is associated with said first input unit, the macro-control process sequence including key codes for operation keys for remotely controlling said remotely controlled devices in a predetermined order, and said control unit: when said first input unit is operated, carries out one of a remote control processing carried out in the same manner as in a case in which operation keys corresponding to the key codes included in the macro-control process sequence that is associated with the operated first input unit are operated, and a predetermined remote control processing, and when the first input unit and the one of said second input units are operated in the predetermined manner, changes a key code in the macro-control process sequence for remotely controlling said signal source device to a key code for remotely controlling the signal source device that has been selected by the operated one of the second input units.

When the first input unit is operated, either the remote control processing carried out in the same manner as in the case in which the operation keys corresponding to the key codes are operated according to the order of the key codes included in the macro-control process sequence, or the predetermined remote control processing is carried out. Then, when the first input unit and the one of the second input units are operated in the predetermined manner, the key code in the macro-control process sequence for remotely controlling the signal source device is changed to the key code for remotely controlling the signal source device that has been selected by the operated one of the second input units. With this, it is possible to change the signal source device to be remotely controlled by the macro-control operation, only by changing the key code for remotely controlling the signal source device in the macro-control process sequence.

In the preferred embodiment of the present invention, the remote controller is further provided with: a third input unit that turns off power of said remotely controlled devices that have been turned on through a macro-control operation by said first input unit, wherein said control unit: when the third input unit is operated, outputs the remote control codes for turning off power of the remotely controlled devices that have been turned on through the macro-control operation by the first input unit to the transmitting unit, and causes the transmitting unit to externally transmit the codes, and when one of the first input unit and the third input unit is operated together with the second input unit in the predetermined manner, changes the signal source device to be turned off by the third input unit to the signal source device that has been selected by the operated one of the second input units.

When one of the first input unit and the third input unit is operated together with the second input unit in the predetermined manner, the signal source device to be turned off by the third input unit is changed to the signal source device that has been selected by the operated one of the second input units. With this, in the remote controller that is further provided with an all-off macro-control operation function, when one of the first input unit and the third input unit is operated together with the second input unit in the predetermined manner, it is possible to change the signal source device to be remotely controlled by the macro-control operation, as well as the signal source device to be turned off by the all-off operation.

In the preferred embodiment of the present invention, the remote controller is used in an audio-visual system including an audio-visual amplifier as one of said remotely controlled devices, the audio-visual amplifier having an input selector for selecting one of the signal source devices to which one of an audio signal and a video signal is inputted, wherein said second input units are operation keys for switching the input selector of the audio-visual amplifier, and the signal source devices selected by the second input units are associated with the operation keys.

Utilizing the operation key for switching the input selector of the audio-visual amplifier to select the signal source device to be changed eliminates necessity of additionally providing single purpose operation keys, and the user can change the signal source device to be remotely controlled through the macro-control operation with the same feeling as the operation of switching the input selector of the audio-visual amplifier.

A remote controller according to the present invention is provided with: a plurality of first input units that turns on power of a plurality of remotely controlled devices; a second input unit that turns off power of the plurality of remotely controlled devices; a memory unit that stores a plurality of remote control codes for remotely controlling the remotely controlled devices; a transmitting unit that externally transmits the remote control codes; and a control unit that outputs the remote control codes to the transmitting unit and causes the transmitting unit to externally transmit the codes, wherein the control unit: when any of the plurality of first input units is operated, outputs remote control codes for turning on power of predetermined remotely controlled devices associated with the operated first input unit to the transmitting unit, and causes the transmitting unit to externally transmit the codes, and when the second input unit is operated, outputs remote control codes for turning off power of the remotely controlled devices that have been turned on by the first input unit that has been operated last time to the transmitting unit, and causes the transmitting unit to externally transmit the codes.

When the second input unit for turning off power of the plurality of remotely controlled devices at the same time is operated, the control unit outputs the remote control codes for turning off power of the remotely controlled devices that have been turned on by the last operated first input unit to the transmitting unit, and causes the transmitting unit to externally transmit the codes. Therefore, it is possible to turn off power of the remotely controlled devices at the same time without fail. Further, the remote control codes that are transmitted to turn off power of the remotely controlled devices at the same time are remote control codes for turning off power of the remotely controlled devices that have been turned on by the last operated first input unit, and therefore only a minimum command is required to be transmitted, and it is possible to reduce a time period from the operation of the second input unit until the remotely controlled devices are turned off.

In the preferred embodiment of the present invention, said memory unit further stores macro-control process sequences that are associated with said first input units, each macro-control process sequence including key codes for operation keys in a predetermined order, the operation keys being for remotely controlling said remotely controlled devices, and said control unit: when any of said first input unit is operated, carries out one of a remote control processing in the same manner as in a case in which the operation keys corresponding to the key codes included in the macro-control process sequence that is associated with the operated first input unit are operated, and a predetermined remote control processing, and when said second input unit is operated, turns off power of the remotely controlled devices whose key codes for turning on power of the remotely controlled devices are included in the macro-control process sequence that is associated with said last operated first input unit.

When the second input unit for turning off power of the plurality of remotely controlled devices at the same time is operated, the control unit turns off power of the remotely controlled devices whose key codes for turning on power are included in the macro-control process sequence that is associated with the last operated first input unit. With this, only by referring to the macro-control process sequence, the control unit can determine the remotely controlled devices to be turned on by the last operated first input unit and turns off power of these remotely controlled devices.

In the preferred embodiment of the present invention, when said macro-control process sequence associated with said last operated first input unit is modified after an operation of the sequence, said control unit, when said second input unit is operated, turns off power only of predetermined remotely controlled devices regardless of the macro-control process sequence associated with the last operated first input unit.

When the macro-control process sequence associated with the last operated first input unit is modified after its operation, and the remotely controlled devices to be turned on by the first input unit are changed, the control unit turns off power only of the predetermined remotely controlled devices regardless of the macro-control process sequence associated with the last operated first input unit. With this, for example, it is possible to turn off power only of the remotely controlled device that is mainly remotely controlled by the remote controller at least.

BRIEF DESCRIPTION OF THE DRAWINGS

FIG. 3 shows a macro-control process sequence;

FIGS. 4A to 4C show macro-control process sequences that are respectively associated with macro-control keys;

FIG. 5 shows a table of operation history;

FIG. 6 shows an all-off operation process sequence;

FIGS. 10A to 10C show all-off operation process sequences that correspond to last operated macro-control keys;

FIG. 14 shows a macro-control process sequence;

FIG. 15 shows an initially configuration of the macro-control process sequence;

FIG. 18 shows the macro-control process sequence after the modification;

FIG. 20 shows an initially configuration of the all-off operation process sequence;

FIG. 23 shows the all-off operation process sequence after the modification.

DETAILED DESCRIPTION OF THE PREFERRED EMBODIMENTS

Figure 1:
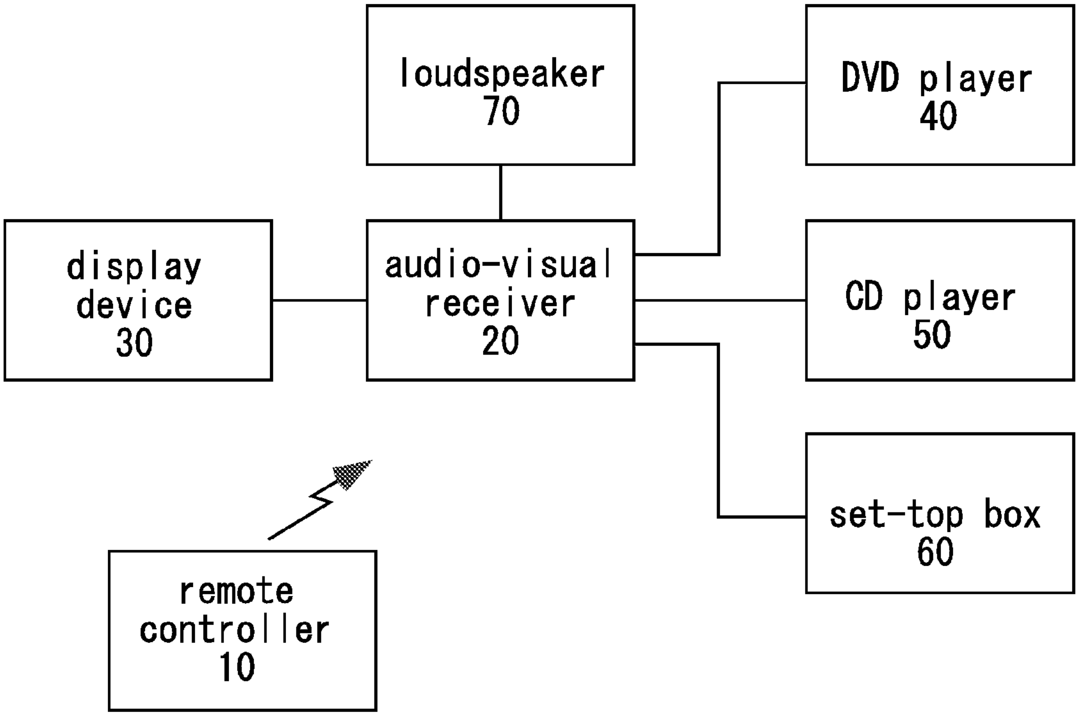
FIG. 1 shows a configurational diagram schematically illustrating an audio-visual system of a preferred embodiment according to the present invention.

The following describes an audio-visual system of preferred embodiments according to the present invention with reference to the drawings. However, the present invention is not limited to these embodiments. It is to be noted that like components are denoted by like reference numerals throughout the drawings, and that explanations for those components are incorporated throughout the description.

FIG. 1 shows a block diagram illustrating a configuration of the audio-visual system of the preferred embodiment according to the present invention. The audio-visual system is provided with a remote controller 10, an audio-visual receiver 20, a display device 30, a DVD player 40 as a signal source device, a CD player 50, a set-top box 60 for cable television, and a loudspeaker 70. The audio-visual receiver 20 is connected to the DVD player 40, the CD player 50, the set-top box 60, and the loudspeaker 70, and outputs an audio signal inputted from the DVD player 40, the CD player 50, or the set-top box 60 to the loudspeaker 70. The audio-visual receiver 20 is also connected to the display device 30, and outputs a video signal inputted from the DVD player 40 or the set-top box 60 to the display device 30. The remote controller 10 recognizes the audio-visual receiver 20, the display device 30, the DVD player 40, the CD player 50, and the set-top box 60 as remotely controlled devices, and is capable of remotely controlling these remotely controlled devices by transmitting remote control codes to the remotely controlled devices. The remote controller 10 according to this embodiment has a macro-control operation function, and is capable of carrying out a series of remote control operations for controlling one or more of the remotely controlled devices with a single key operation (macro-control operation). The remote controller 10 is further capable of carrying out a remote control operation for turning off power of the remotely controlled devices that are turned on by the previous macro-control operation at the same time (all-off operation). In the following, the remote controller 10 is described in detail with reference to FIG. 2 to FIG. 10.

Figure 2:
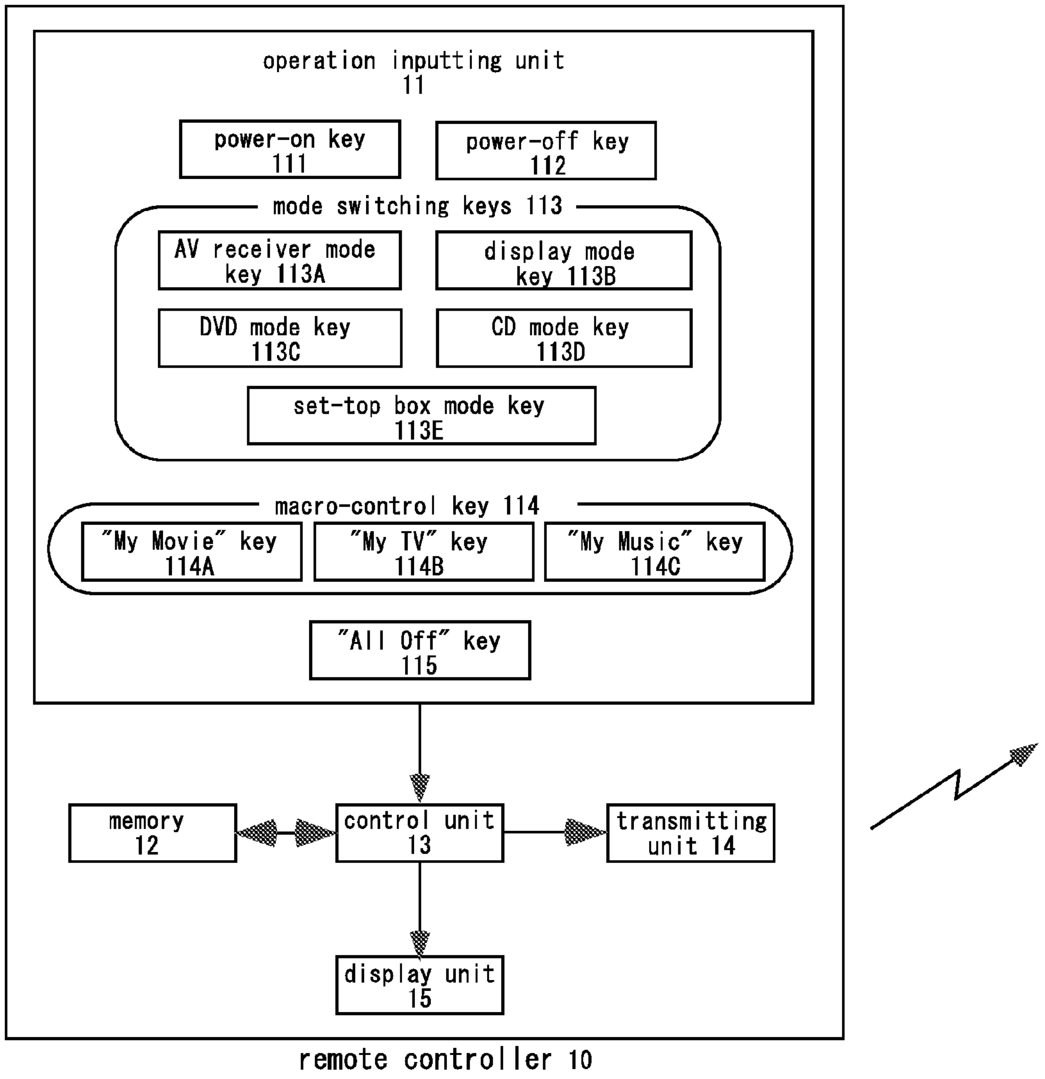
FIG. 2 shows a block diagram illustrating a remote controller of the preferred embodiment according to the present invention.

FIG. 2 shows a block diagram illustrating a configuration of the remote controller 10. The remote controller 10 is provided with an operation inputting unit 11, a memory 12, a control unit 13, a transmitting unit 14, and a display unit 15. The operation inputting unit 11 is provided with operation elements such as operation keys that are provided on an upper surface of the remote controller 10. The memory 12 stores a plurality of remote control codes for controlling the remotely controlled devices. The control unit 13 controls behavior of the remote controller 10 as a whole, and, based on an a user's operation to instruct an operation inputted through the operation inputting unit 11, controls the behavior of the remote controller 10 as a whole and reads a remote control code from the memory 12 and outputs the remote control code to the transmitting unit 14. The transmitting unit 14 converts the remote control code inputted from the control unit 13 to an infrared signal and outputs the signal externally. The display unit 15 is constituted by a liquid crystal panel, for example, and displays such as contents of an operation. It should be noted that by configuring the display unit 15 as a touch-sensitive panel, the display unit 15 can be integrated with the operation unit 11. In this embodiment, there are five remote control modes of the remote controller 10 including: an audio-visual receiver mode for remotely controlling the audio-visual receiver 20, a display mode for remotely controlling the display device 30, a DVD mode for remotely controlling the DVD player 40, a CD mode for remotely controlling the CD player 50, and a set-top box mode for remotely controlling the set-top box 60.

The operation inputting unit 11 includes, as the operation keys, a power-on key 111 for turning on power of the remotely controlled devices, a power-off key 112 for turning off power of the remotely controlled devices, mode switching keys 113 for switching between the remote control modes, and macro-control keys 114 for macro-controlling to carry out a plurality of remote control operations to one or more of the remotely controlled devices with a single key operation.

In this embodiment, the operation inputting unit 11 includes, as the mode switching keys 113, an audio-visual receiver mode key 113A for setting the remote controller 10 to the audio-visual receiver mode, a display mode key 113B for setting the remote controller 10 to the display mode, a DVD mode key 113C for setting the remote controller 10 to the DVD mode, a CD mode key 113D for setting the remote controller 10 to the CD mode, and a set-top box mode key 113E for setting the remote controller 10 to the set-top box mode. The remote control mode of the remote controller 10 that is set using one of these mode switching keys 113 determines a remotely controlled device that is to be remotely controlled by the power-on key 111 and the power-off key 112. That is, the remotely controlled device to which the remote control code is transmitted when the power-on key 111 or the power-off key 112 is operated is determined based on the remote control mode. For example, if the power-on key 111 is operated when the remote controller 10 is set to the audio-visual receiver mode, a remote control code for turning on power of the audio-visual receiver 20 is transmitted from the remote controller 10. Alternatively, if the power-on key 111 is operated when the remote controller 10 is set to the display mode, a remote control code for turning on power of the display 30 is transmitted from the remote controller 10.

Further, the operation inputting unit 11 includes, as the macro-control keys 114, a "My Movie" key 114A, a "My TV" key 114B, and a "My Music" key 114C.

In this embodiment, the "My Movie" key 114A is a button switch for macro-controlling the audio-visual receiver 20, the display device 30, and the DVD player 40 when watching movies. Specifically, the "My Movie" key 114A is a macro-control key for a macro-control operation of turning on power of the audio-visual receiver 20, the display device 30, and the DVD player 40.

The "My TV" key 114B is a button switch for macro-controlling the audio-visual receiver 20, the display device 30, and the set-top box 60 when watching television. Specifically, the "My TV" key 114B is a macro-control key for a macro-control operation of turning on power of the audio-visual receiver 20, the display device 30, and the set-top box 60.

The "My Music" key 114C is a button switch for macro-controlling the audio-visual receiver 20 and the CD player 50 when listening to music. Specifically, the "My Music" key 114C is a macro-control key for a macro-control operation of turning on power of the audio-visual receiver 20 and the CD player 50.

The operation inputting unit 11 also includes an "All Off" key 115. The "All Off" key 115 is an operation key for an all-off operation for turning off power of the remotely controlled devices that are turned on by a macro-control operation that has been carried out last time out of the macro-control operations carried out by the "My Movie" key 114A, the "My TV" key 114B, and the "My Music" key 114C. Specifically, if the last macro-control operation is carried out by the "My Movie" key 114A, the "All Off" key 115 is configured as an operation key for turning off power of the audio-visual receiver 20, the display device 30, and the DVD player 40 at the same time. If the last macro-control operation is carried out by the "My TV" key 114B, the "All Off" key 115 is configured as an operation key for turning off power of the audio-visual receiver 20, the display device 30, and the set-top box 60 at the same time. If the last macro-control operation is carried out by the "My Music" key 114C, the "All Off" key 115 is configured as an operation key for turning off power of the audio-visual receiver 20 and the CD player 50 at the same time.

The memory 12 stores macro-control process sequences that are respectively associated with the "My Movie" key 114A, the "My TV" key 114B, and the "My Music" key 114C. FIG. 3 shows a macro-control process sequence. The macro-control process sequence according to this embodiment is such that a plurality of key codes are registered in a predetermined order and is carried out by the control unit 13 when one of the macro-control keys 114 is operated. Specifically, when the macro-control key 114 is operated, a remote control processing is carried out in the same manner as in a case in which operation keys that correspond to the key codes registered to the macro-control process sequence are operated in the registered order. As used herein, the key codes are identification codes each associated with an operation key to specify the corresponding operation key. The macro-control process sequence is registered with a remotely controlled device to be turned on according to a combination of a key code for the mode switching key 113 and a key code for the power-on key 111. Specifically, as shown in FIG. 3, a key code for the display mode key 113B as a first key code and the key code for the power-on key 111 as a second key code are registered to the macro-control process sequence, and the display device 30 is turned on based on these key codes. Further, a key code for a mode switching key for a signal source device (the DVD mode key 113C, the CD mode key 113D, or the set-top box mode key 113E) as a third key code and the key code for the power-on key 111 as a fourth key code are registered to the macro-control process sequence, and the signal source device (corresponding one of the DVD player 40, the CD player 50, and the set-top box 60) is turned on based on these key codes. Moreover, a key code for the audio-visual receiver mode key 113A as a fifth key code and the key code for the power-on key 111 as a sixth key code are registered to the macro-control process sequence, and the audio-visual receiver 20 is turned on based on these key codes.

FIGS. 4A to 4C show macro-control process sequences that are respectively associated with the "My Movie" key 114A, the "My TV" key 114B, and the "My Music" key 114C. A key code for the DVD mode key 113C as the third key code is registered with a macro-control process sequence A associated with the "My Movie" key 114A, as the signal source device is the DVD player 40 (FIG. 4A). A key code for the set-top box mode key 113E as the third key code is registered with a macro-control process sequence B associated with the "My TV" key 114B, since the signal source device is the set-top box 60 (FIG. 4B). A key code for the CD mode key 113D as the third key code is registered with a macro-control process sequence C associated with the "My Music" key 114C, as the signal source device is the CD player (FIG. 4C). It should be noted that the key code for the power-on key 111 as the second key code is not registered to the macro-control process sequence C, as it is not necessary to turn on power of the display device 30 when listening to music.

The memory 12 also stores an operation history table. FIG. 5 shows the operation history table. In the operation history table, operation history information is recorded indicating which one of the "My Movie" key 114A, the "My TV" key 114B, and the "My Music" key 114C has been last operated. For example, if the "My Movie" key 114A has been last operated out of the "My Movie" key 114A, the "My TV" key 114B, and the "My Music" key 114C, a key code for the "My Movie" key 114A is recorded in the operation history table, as shown in FIG. 5.

The memory 12 also stores an all-off operation process sequence that is associated with the "All Off" key 115. FIG. 6 shows the all-off operation process sequence. The all-off operation process sequence according to this embodiment is such that a plurality of key codes are registered in a predetermined order and is carried out by the control unit 13 when the "All Off" key 115 is operated. Specifically, when the "All Off" key 115 is operated, a remote control processing is carried out in the same manner as in a case in which operation keys that correspond to the key codes registered to the all-off operation process sequence are operated in the registered order. The all-off operation process sequence is registered with remotely controlled devices to be turned off according to a combination of the key code for the mode switching key 113 and a key code for the power-off key 112. Specifically, as shown in FIG. 6, the key code for the audio-visual receiver mode key 113A as a first key code and the key code for the power-off key 112 as a second key code are registered to the all-off operation process sequence, and the audio-visual receiver 20 is turned off based on these key codes. Further, the key code for the display mode key 113B as a third key code and the key code for the power-off key 112 as a fourth key code are registered to the all-off operation process sequence, and the display device 30 is turned off based on these key codes. Further, a key code for a mode switching key for a signal source device (the DVD mode key 113C, the CD mode key 113D, or the set-top box mode key 113E) as a fifth key code and the key code for the power-off key 112 as a sixth key code are registered to the all-off operation process sequence, and the signal source device is turned off based on these key codes. In the all-off operation process sequence, the key codes registered to the all-off operation process sequence are different depending on the macro-control key 114 that has been last operated when the "All Off" key 115 is operated: the "My Movie" key 114A, the "My TV" key 114B, or the "My Music" key 114C (will be described later in detail).

The control unit 13 carries out, when any of the "My Movie" key 114A, the "My TV" key 114B, and the "My Music" key 114C is operated, a macro-control process sequence that is associated with this operation key (macro-control process). The control unit 13 also carries out an operation history recording process for storing the macro-control key that has been last operated, out of the "My Movie" key 114A, the "My TV" key 114B, and the "My Music" key 114C, to the operation history table as the operation history information. Then, when the "All Off" key 115 is operated, the control unit 13 refers to the operation history information, configures the all-off operation process sequence so as to turn off power of remotely controlled devices that have been turned on through the macro-control operation by the last operated macro-control key 114, and carries out the all-off operation process sequence (all-off operation process).

Macro-Control Process

The following describes the macro-control process carried out by the control unit 13 when one of the "My Movie" key 114A, the "My TV" key 114B, and the "My Music" key 114C is operated.

Figure 7A:
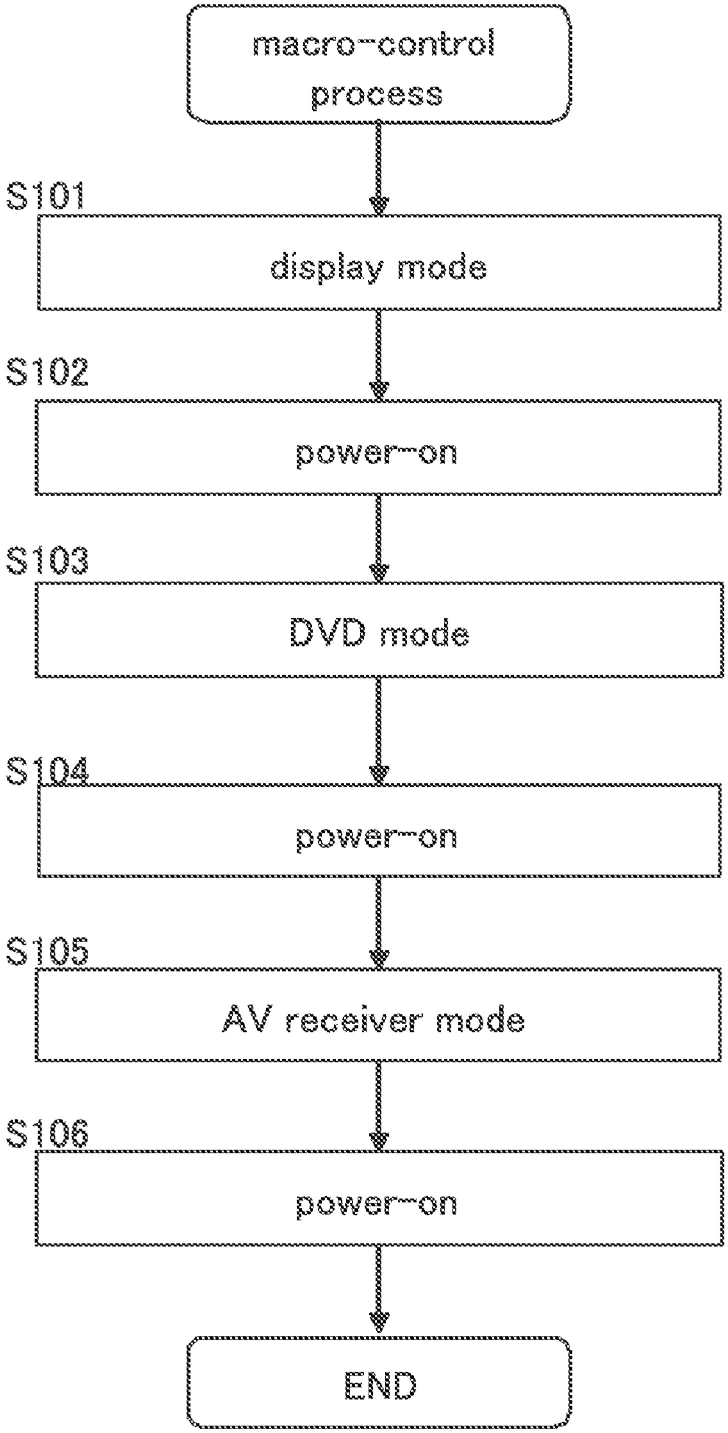
FIGS. 7A to 7C each show a flow chart of the macro-control process.

FIG. 7A shows a flow chart of a macro-control process carried out by the control unit 13 when the "My Movie" key 114A is operated. When the "My Movie" key 114A is operated, the control unit 13 refers to the macro-control process sequence A associated with the "My Movie" key 114A, and carries out the macro-control process. That is, the control unit 13 carries out a remote control processing in the same manner as in a case in which the display mode key 113B, the power-on key 111, the DVD mode key 113C, the power-on key 111, the audio-visual receiver mode key 113A, and the power-on key 111 are operated in the stated order. Specifically, the control unit 13 carries out a process for switching the remote control mode to the display mode (S101). Then, the control unit 13 carries out a power-on process (S102). Specifically, as the remote control mode is set to the display mode in step S101, the control unit 13 reads the remote control code for turning on power of the display device 30 from the memory 12, outputs the code to the transmitting unit 14, and causes the code to be transmitted from the transmitting unit 14. Subsequently, the control unit 13 carries out a process for switching the remote control mode to the DVD mode (S103). Then, the control unit 13 carries out the power-on process (S104). Specifically, as the remote control mode is set to the DVD mode in step S103, the control unit 13 reads a remote control code for turning on power of the DVD player 40 from the memory 12, outputs the code to the transmitting unit 14, and causes the code to be transmitted from the transmitting unit 14. Next, the control unit 13 carries out a process for switching the remote control mode to the audio-visual receiver mode (S105). Then, the control unit 13 carries out the power-on process (S106). Specifically, as the remote control mode is set to the audio-visual receiver mode in step S105, the control unit 13 reads the remote control code for turning on power of the audio-visual receiver 20 from the memory 12, outputs the code to the transmitting unit 14, and causes the code to be transmitted from the transmitting unit 14.

Figure 7B:
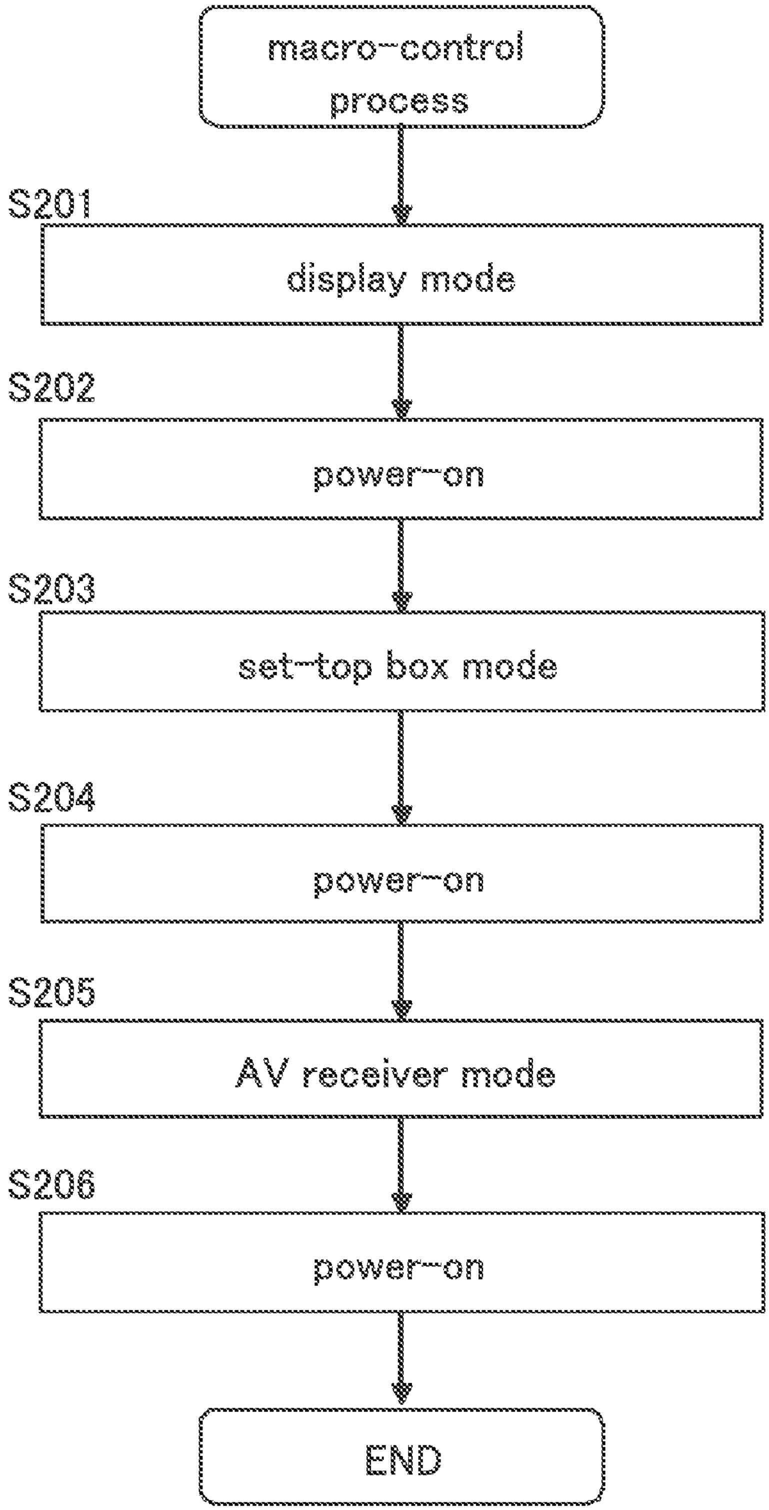

FIG. 7B shows a flow chart of a macro-control process carried out by the control unit 13 when the "My TV" key 114B is operated. When the "My TV" key 114B is operated, the control unit 13 refers to the macro-control process sequence B associated with the "My TV" key 114B, and carries out the macro-control process. That is, the control unit 13 carries out a remote control processing in the same manner as in a case in which the display mode key 113B, the power-on key 111, the set-top box mode key 113E, the power-on key 111, the audio-visual receiver mode key 113A, and the power-on key 111 are operated in the stated order. Specifically, the control unit 13 carries out a process for switching the remote control mode to the display mode (S201). Then, the control unit 13 carries out the power-on process (S202). Specifically, as the remote control mode is set to the display mode in step S201, the control unit 13 reads the remote control code for turning on power of the display device 30 from the memory 12, outputs the code to the transmitting unit 14, and causes the code to be transmitted from the transmitting unit 14. Subsequently, the control unit 13 carries out a process for switching the remote control mode to the set-top box mode (S203). Then, the control unit 13 carries out the power-on process (S204). Specifically, as the remote control mode is set to the set-top box mode in step S203, the control unit 13 reads a remote control code for turning on power of the set-top box 60 from the memory 12, outputs the code to the transmitting unit 14, and causes the code to be transmitted from the transmitting unit 14. Next, the control unit 13 carries out a process for switching the remote control mode to the audio-visual receiver mode (S205). Then, the control unit 13 carries out the power-on process (S206). Specifically, as the remote control mode is set to the audio-visual receiver mode in step S205, the control unit 13 reads the remote control code for turning on power of the audio-visual receiver 20 from the memory 12, outputs the code to the transmitting unit 14, and causes the code to be transmitted from the transmitting unit 14.

Figure 7C:
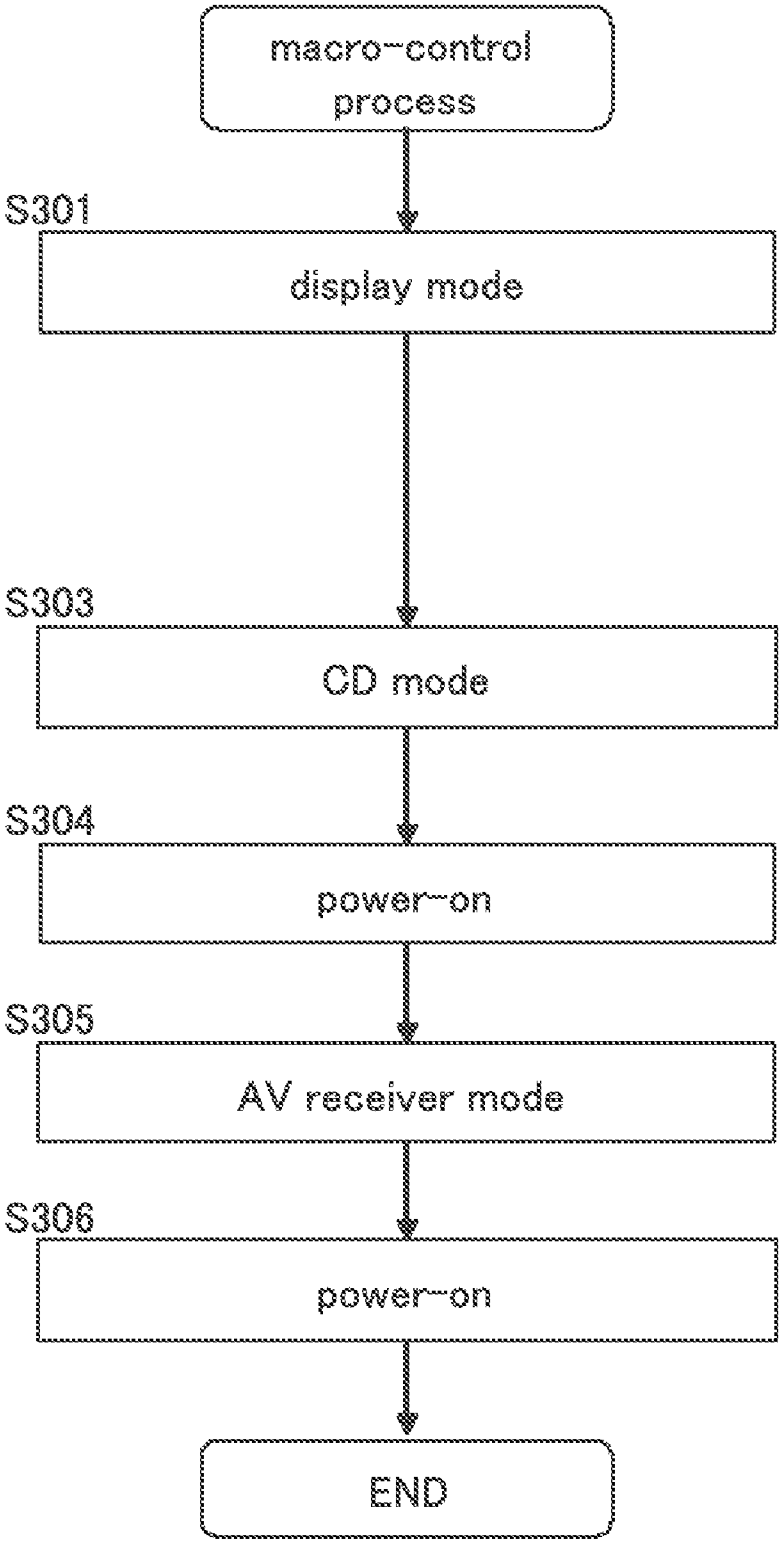

FIG. 7C shows a flow chart of a macro-control process carried out by the control unit 13 when the "My Music" key 114C is operated. When the "My Music" key 114C is operated, the control unit 13 refers to the macro-control process sequence C associated with the "My Music" key 114C, and carries out the macro-control process. That is, the control unit 13 carries out a remote control processing in the same manner as in a case in which the display mode key 113B, the CD mode key 113D, the power-on key 111, the audio-visual receiver mode key 113A, and the power-on key 111 are operated in the stated order. Specifically, the control unit 13 carries out a process for switching the remote control mode to the display mode (S301). Subsequently, the control unit 13 carries out a process for switching the remote control mode to the CD mode (S303). Then, the control unit 13 carries out the power-on process (S304). Specifically, as the remote control mode is set to the CD mode in step S303, the control unit 13 reads a remote control code for turning on power of the CD player 50 from the memory 12, outputs the code to the transmitting unit 14, and causes the code to be transmitted from the transmitting unit 14. Next, the control unit 13 carries out a process for switching the remote control mode to the audio-visual receiver mode (S305). Then, the control unit 13 carries out the power-on process (S306). Specifically, as the remote control mode is set to the audio-visual receiver mode in step S305, the control unit 13 reads the remote control code for turning on power of the audio-visual receiver 20 from the memory 12, outputs the code to the transmitting unit 14, and causes the code to be transmitted from the transmitting unit 14.

Operation History Recording Process

Figure 8:
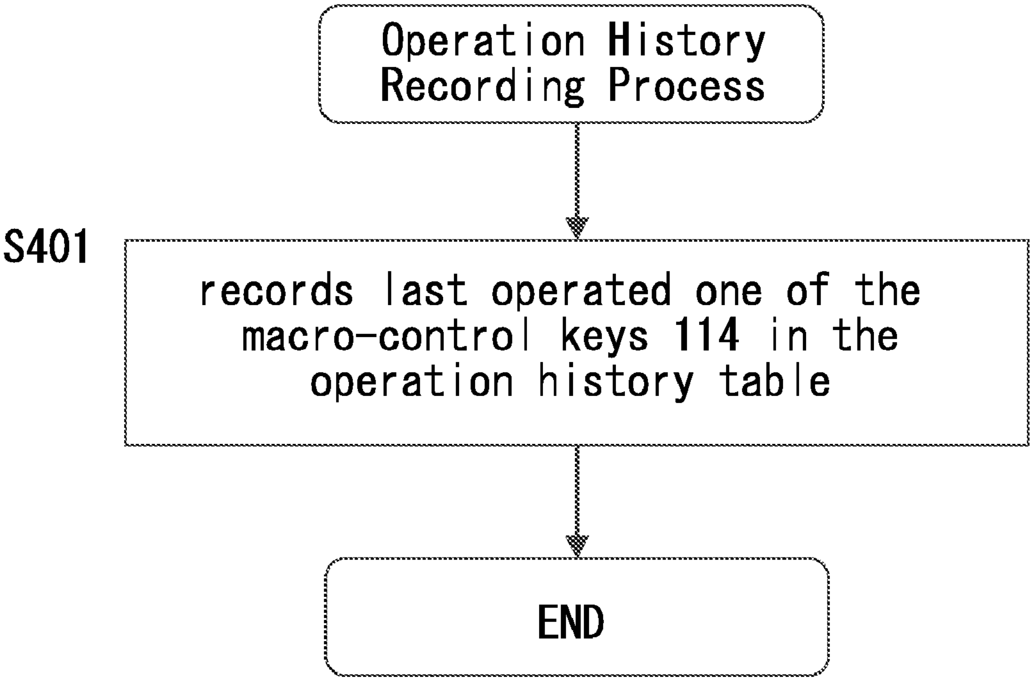
FIG. 8 shows a flow chart of an operation history recording process.

The following describes the operation history recording process. FIG. 8 shows a flow chart of the operation history recording process of the control unit 13. The control unit 13 records last operated one of the macro-control keys 114 in the operation history table (S401). Specifically, when any of the "My Movie" key 114A, the "My TV" key 114B, and the "My Music" key 114C is operated, the control unit 13 sets this operation key as the last operated macro-control key 114, and records the key code for this operation key in the operation history table. The control unit 13 carries out the operation history recording process every time when the "My Movie" key 114A, the "My TV" key 114B, or the "My Music" key 114C is operated, and updates the operation history table.

All-Off Operation Process

Next, the all-off operation process carried out by the control unit 13 when the "All Off" key 115 is operated is specifically described.

Figure 9:
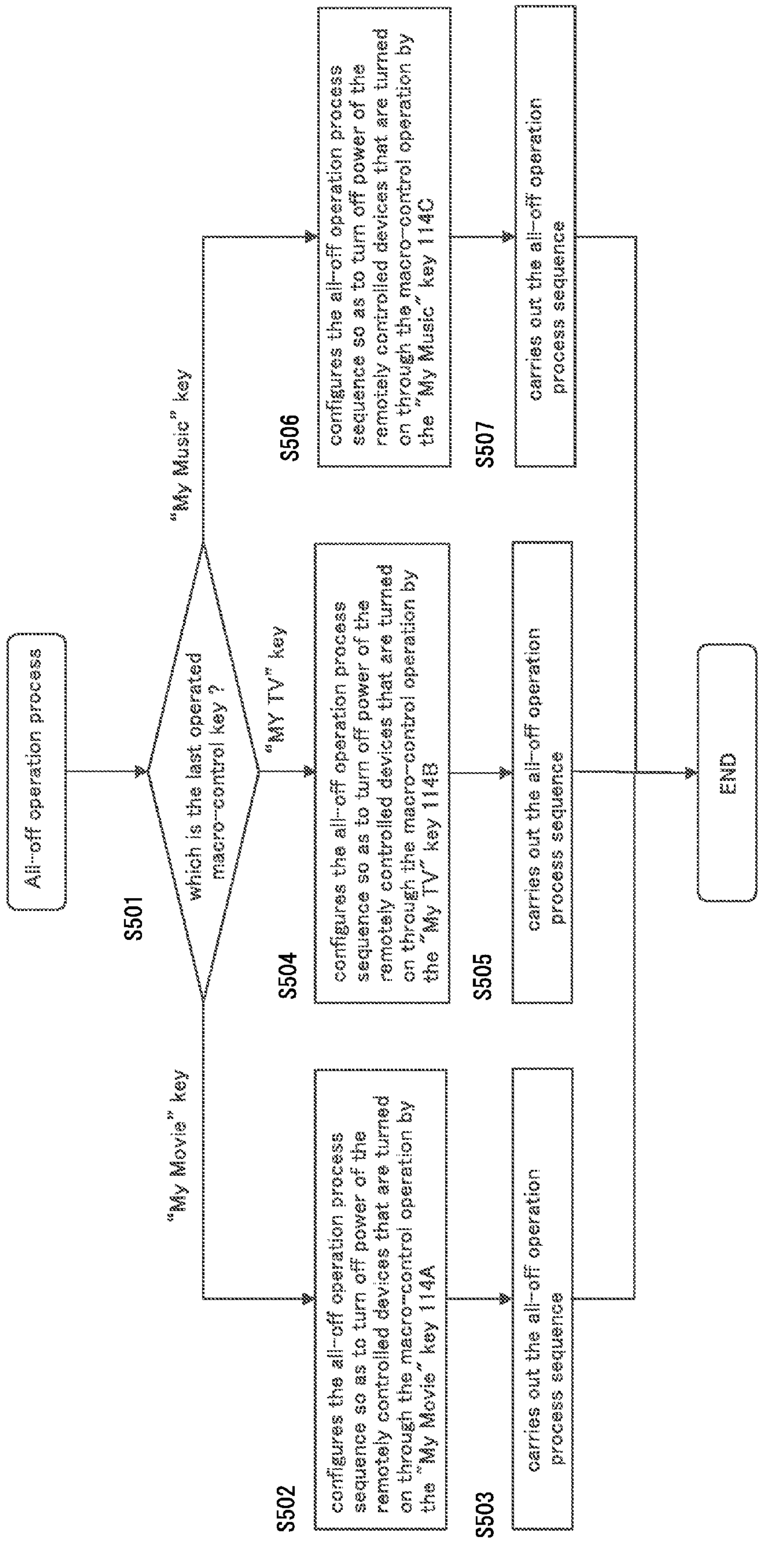
FIG. 9 shows a flow chart of the all-off operation process.

FIG. 9 shows a flowchart of the all-off operation process of the control unit 13 when the "All Off" key 115 is operated. When the "All Off" key 115 is operated, the control unit 13 determines which one of the "My Movie" key 114A, the "My TV" key 114B, and the "My Music" key 114C is the last operated macro-control key 114 (S501). Specifically, the control unit 13 determines which macro-control key 114 has been operated last time from the key code recorded in the operation history table.

If it is determined that the "My Movie" key 114A is the last operated macro-control key 114 in step S501, the control unit 13 refers to the macro-control process sequence A associated with the "My Movie" key 114A, and configures the all-off operation process sequence so as to turn off power of the remotely controlled devices that are turned on through the macro-control operation by the "My Movie" key 114A (S502). FIG. 10A shows an all-off operation process sequence configured in step S502. Since the key code for the audio-visual receiver mode key 113A and the key code for the power-on key 111 for turning on power of the audio-visual receiver 20 are respectively registered as the fifth key code and the sixth key code in the macro-control process sequence A associated with the "My Movie" key 114A, the control unit 13 determines that the audio-visual receiver 20 is turned on through the macro-control operation by the "My Movie" key 114A, and registers the key code for the audio-visual receiver mode key 113A as a first key code and the key code for the power-off key 112 as a second key code in the all-off operation process sequence. Further, since the key code for the display mode key 113B and the key code for the power-on key 111 for turning on power of the display device 30 are respectively registered as the first key code and the second key code in the macro-control process sequence A, the control unit 13 determines that the display device 30 is turned on through the macro-control operation by the "My Movie" key 114A, and registers the key code for the display mode key 113B as a third key code and the key code for the power-off key 112 as a fourth key code in the all-off operation process sequence. Moreover, since the key code for the DVD mode key 113C and the key code for the power-on key 111 for turning on power of the DVD player 40 are respectively registered as the third key code and the fourth key code in the macro-control process sequence A, the control unit 13 determines that the DVD player 40 is turned on through the macro-control operation by the "My Movie" key 114A, and registers the key code for the DVD mode key 113C as a fifth key code and the key code for the power-off key 112 as a sixth key code in the all-off operation process sequence.

Next, the control unit 13 carries out the all-off operation process sequence (S503). Specifically, the control unit 13 refers to the all-off operation process sequence, and carries out a remote control processing in the same manner as in a case in which the audio-visual receiver mode key 113A, the power-off key 112, the display mode key 113B, the power-off key 112, the DVD mode key 113C, and the power-off key 112 are operated in the stated order. As a result, remote control codes for turning off power of the audio-visual receiver 20, the display device 30, and the DVD player 40 are transmitted from the remote controller 10, thereby turning off the audio-visual receiver 20, the display device 30, and the DVD player 40 that have been turned on through the macro-control operation by the "My Movie" key 114A that has been last operated.

If it is determined that the "My TV" key 114B is the last operated macro-control key 114 in step S501, the control unit 13 refers to the macro-control process sequence B associated with the "My TV" key 114B, and configures the all-off operation process sequence so as to turn off power of the remotely controlled devices that are turned on through the macro-control operation by the "My TV" key 114B (S504). FIG. 10B shows an all-off operation process sequence configured in step S504. Since the key code for the audio-visual receiver mode key 113A and the key code for the power-on key 111 for turning on power of the audio-visual receiver 20 are respectively registered as the fifth key code and the sixth key code in the macro-control process sequence B associated with the "My TV" key 114B, the control unit 13 determines that the audio-visual receiver 20 is turned on through the macro-control operation by the "My TV" key 114B, and registers the key code for the audio-visual receiver mode key 113A as the first key code and the key code for the power-off key 112 as the second key code in the all-off operation process sequence. Further, since the key code for the display mode key 113B and the key code for the power-on key 111 for turning on power of the display device 30 are respectively registered as the first key code and the second key code in the macro-control process sequence B, the control unit 13 determines that the display device 30 is turned on through the macro-control operation by the "My TV" key 114B and registers the key code for the display mode key 113B as the third key code and the key code for the power-off key 112 as the fourth key code in the all-off operation process sequence. Moreover, since the key code for the set-top box mode key 113E and the key code for the power-on key 111 for turning on power of the set-top box 60 are respectively registered as the third key code and the fourth key code in the macro-control process sequence B, the control unit 13 determines that the set-top box 60 is turned on through the macro-control operation by the "My TV" key 114B, and registers the key code for the set-top box mode key 113E as the fifth key code and the key code for the power-off key 112 as the sixth key code in the all-off operation process sequence.

Next, the control unit 13 carries out the all-off operation process sequence (S505). Specifically, the control unit 13 refers to the all-off operation process sequence, and carries out a remote control processing in the same manner as in a case in which the audio-visual receiver mode key 113A, the power-off key 112, the display mode key 113B, the power-off key 112, the set-top box mode key 113E, an the power-off key 112 are operated in the stated order. As a result, remote control codes for turning off power of the audio-visual receiver 20, the display device 30, and the set-top box 60 are transmitted from the remote controller 10, thereby turning off the audio-visual receiver 20, the display device 30, and the set-top box 60 that have been turned on through the macro-control operation by the “My TV” key 114B that has been last operated.

If it is determined that the “My Music” key 114C is the last operated macro-control key 114 in step S501, the control unit 13 refers to the macro-control process sequence C associated with the “My Music” key 114C, and configures the all-off operation process sequence so as to turn off power of the remotely controlled devices that are turned on through the macro-control operation by the “My Music” key 114C (S506). FIG. 10C shows an all-off operation process sequence configured in step S506. Since the key code for the audio-visual receiver mode key 113A and the key code for the power-on key 111 for turning on power of the audio-visual receiver 20 are respectively registered as the fifth key code and the sixth key code in the macro-control process sequence C associated with the “My Music” key 114C, the control unit 13 determines that the audio-visual receiver 20 is turned on through the macro-control operation by the “My Music” key 114C, and registers the key code for the audio-visual receiver mode key 113A as the first key code and the key code for the power-off key 112 as the second key code in the all-off operation process sequence. Further, since the key code for the power-on key 111 for turning on power of the display device 30 is not registered as the second key code in the macro-control process sequence C, the control unit 13 determines that the display device 30 is not turned on through the macro-control operation by the “My Music” key 114C, and does not register the key code for the power-off key 112 as the fourth key code in the all-off operation process sequence. Moreover, since the key code for the CD mode key 113D and the key code for the power-on key 111 for turning on power of the CD player 50 are respectively registered as the third key code and the fourth key code in the macro-control process sequence C, the control unit 13 determines that the CD player 50 is turned on through the macro-control operation by the “My Music” key 114C, and registers the key code for the CD mode key 113D as the fifth key code and the key code for the power-off key 112 as the sixth key code in the all-off operation process sequence.

Next, the control unit 13 carries out the all-off operation process sequence (S507). Specifically, the control unit 13 refers to the all-off operation process sequence, and carries out a remote control processing in the same manner as in a case in which the audio-visual receiver mode key 113A, the power-off key 112, the display mode key 113B, the CD mode key 113D, and the power-off key 112 are operated in the stated order. As a result, remote control codes for turning off power of the audio-visual receiver 20 and the CD player 50 are transmitted from the remote controller 10, thereby turning off the audio-visual receiver 20 and the CD player 50 that have been turned on through the macro-control operation by the “My Music” key 114C that has been last operated.

As described above, operating the “All Off” key 115 turns off power only of the remotely controlled devices that have been turned on through the macro-control operation by the macro-control key 114 that has been operated last time out of the “My Movie” key 114A, the “My TV” key 114B, and the “My Music” key 114C, it is possible to turn off power of the remotely controlled devices at the same time without fail. In addition, the remote control codes that are transmitted in order to turn off power of the remotely controlled devices only include the remote control codes for turning off power of the remotely controlled devices that have been turned on through the macro-control operation by the last operated macro-control key 114. Accordingly, only minimum required remote control codes are transmitted, and thus it is possible to reduce a time period from the operation of the “All Off” key 115 until the remotely controlled devices are turned off. Further, only by referring to the macro-control process sequence associated with the last operated macro-control key 114 when the “All Off” key 115 is operated, it is possible to determine the remotely controlled devices that are turned on by the macro-control key 114.

The following describes a different preferred embodiment according to the present invention. According to the remote controller 10 of the different preferred embodiment of the present invention, it is possible to make modification to the operation macro-controlled by the “My Movie” key 114A, the “My TV” key 114B, or the “My Music” key 114C so as to configure a macro-control operation of the user’s preference. For example, in order to listen to music using another external device (not shown) instead of the CD player 50, it is possible to make modification to configure the “My Music” key 114C as a macro-control key for turning on power of the audio-visual receiver 20 and the external device. In this case, the fifth key code in the macro-control process sequence C associated with the “My Music” key 114C is modified form the key code for the CD mode key 113D to a key code for a mode switching key (not shown) for remotely controlling the external device. In such a case, the control unit 13 often determines that the audio-visual receiver 20 and the external device are turned on through the macro-control process sequence C after the modification even when the audio-visual receiver 20 and the CD player 50 have been turned on through the macro-control operation by the “My Music” key 114C before the modification. Therefore, in order to turn off power of the remotely controlled device that is mainly remote-controlled at least by the remote controller 10, when the “All Off” key 115 is operated and if the macro-control process sequence associated with the last operated macro-control key 114 has been modified after this operation, the control unit 13 turns off power only of the remotely controlled device that is mainly remote-controlled by the remote controller 10, regardless of the macro-control process sequence associated with the last operated macro-control key 114.

Figure 11:
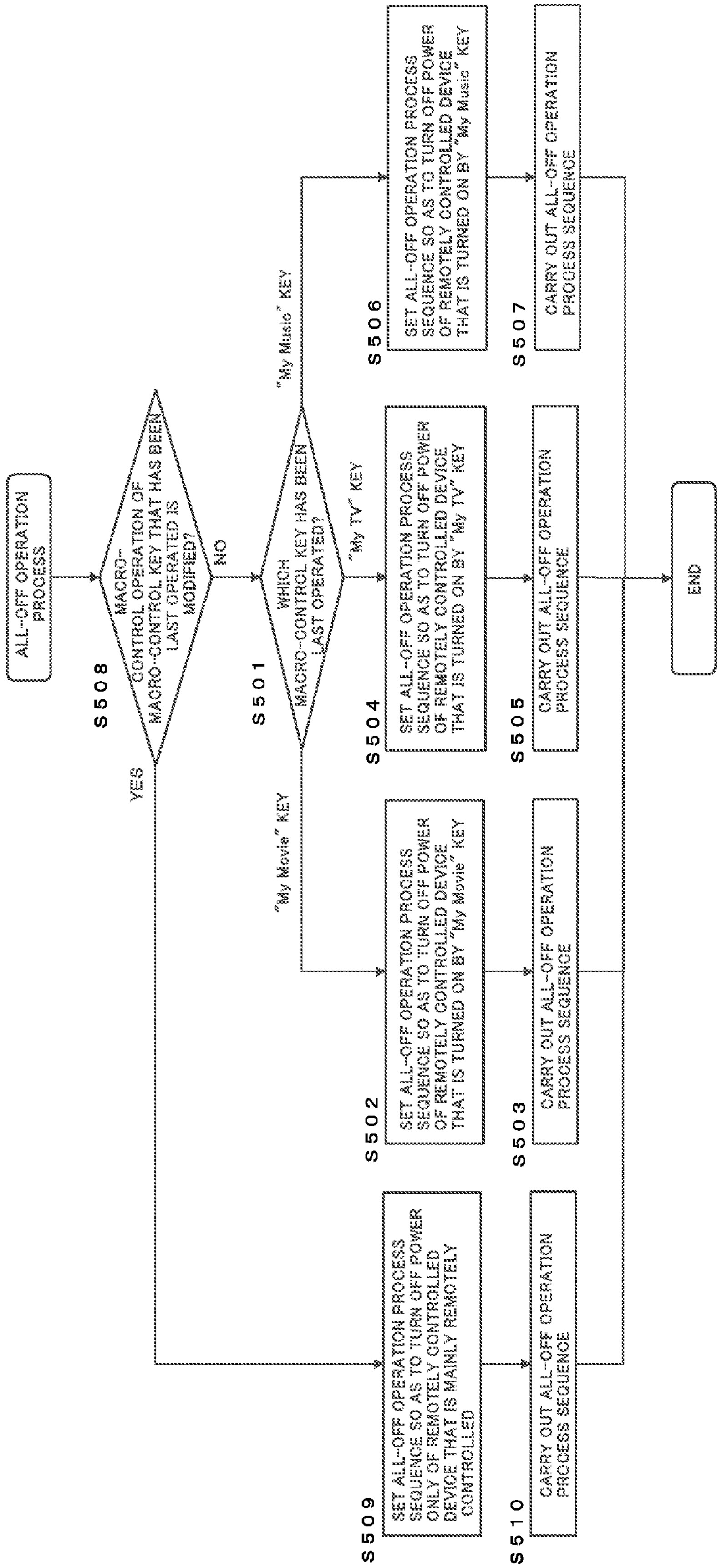
FIG. 11 shows a flow chart of the all-off operation process.

FIG. 11 shows a flow chart of the all-off operation process of the different preferred embodiment according to the present invention. Descriptions of portions of the process that are the same as the all-off operation process in FIG. 9 are not given herein. When the “All Off” key 115 is operated, the control unit 13 determines whether or not the macro-control process sequence associated with the last operated macro-control key 114 has been modified after this operation (S508). If it is determined that the modification has been made (S508: YES), the control unit 13 registers the key code for turning off power only of the audio-visual receiver 20 to the all-off operation process sequence (S509). The key code for turning off power only of the audio-visual receiver 20 is registered because the audio-visual receiver 20 is the remotely controlled device that is mainly remote-controlled by the remote controller 10 according to this embodiment. Then, the control unit 13 carries out the all-off operation process sequence (S510). With this, when the macro-control process is associated with the last operated macro-control key 114 but modified after the operation, the audio-visual receiver 20 that is mainly remote-controlled is turned off.

Further, as described above, there is often a case in which only the audio-visual receiver 20 is turned off when the "All Off" key 115 is operated, the all-off operation process sequence is configured to be set with the key code for turning off power of the audio-visual receiver 20 as the first key code and the second key code. In this manner, when the control unit 13 carries out the all-off operation process sequence, the remote control processing for turning off power of the audio-visual receiver 20 is immediately carried out, and therefore it is possible to reduce a time period from the operation of the "All Off" key 115 until the audio-visual receiver 20 is turned off.

Although the macro-control key 114 is explained to be for the macro-control operation for turning on power of the remotely controlled devices, the macro-control operation can include such as switching an input selector of the audio-visual receiver 20 to the signal source device and causing the signal source device to start a playback operation. In this case, the key code for the operation key for this operation is added to the macro-control process sequence.

Further, the remote control code for turning off power of the remotely controlled devices that is transmitted when the "All Off" key 115 is operated is different from the remote control code that is transmitted according to power-on/power-off specification of the remotely controlled device. That is, in a case of a remotely controlled device for which a remote control code for power-on and a remote control code for power-off are used and in which the power is turned on when the remote control code for power-on is received and turned off when the remote control code for power-off is received, the control unit 13 reads the remote control code for power-off from the memory 12, outputs the code to the transmitting unit 14, and causes the code to be transmitted from the transmitting unit 14. On the other hand, the remote control code for power-off is not provided for a remotely controlled device that is designed to use a single power on/off remote control code and carry out a toggle operation of toggling between on and off of power every time when the remote control code is received, and the control unit 13 reads a power on/off remote control code from the memory 12 as the remote control code for power-off, outputs the code to the transmitting unit 14, and causes the code to be transmitted from the transmitting unit 14. In this manner, only the remotely controlled devices that are turned on through the macro-control operation by the last operated macro-control key 114 are turned off by the remote control code according to the power-on/power-off specification of this remotely controlled device, and therefore it is possible to avoid turning on power of the remotely controlled device that the user does not desire or turning on power of the remotely controlled device that the user desires.

Further, although the macro-control process of the control unit 13 based on the macro-control process sequence or the all-off operation process sequence is explained to be the same as the remote control processing carried out when the operation key corresponding to the key code registered to the macro-control process sequence or the all-off operation process sequence is operated, the present invention is not limited to this example. For example, in a case in which a single operation key is configured such that a plurality of processes are carried out, in the macro-control process of the control unit 13 based on the macro-control process sequence or the all-off operation process sequence, it is possible to carry out a predetermined remote control processing for which some of the processes are omitted out of the processes set for the operation key corresponding to the registered key code.

Figure 12:
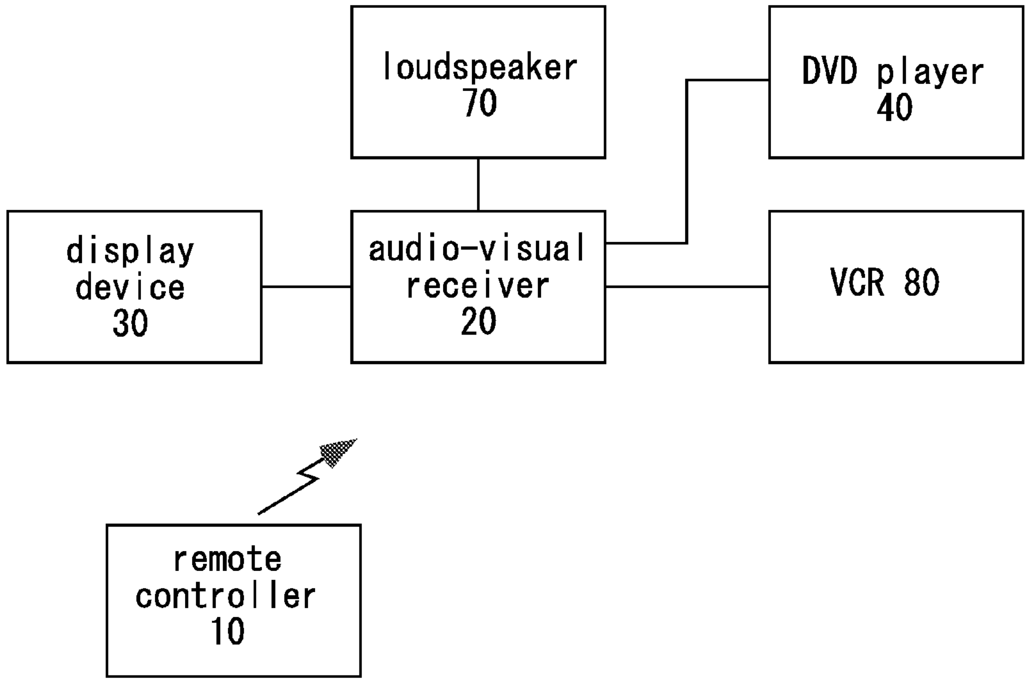
FIG. 12 shows a configurational diagram schematically illustrating the audio-visual system.

Next, a further different preferred embodiment according to the present invention is described. FIG. 12 shows a block diagram illustrating a configuration of an audio-visual system of the further different preferred embodiment according to the present invention. The audio-visual receiver 20, the display device 30, the DVD player 40 as a signal source device, and the loudspeaker 70 are as described with reference to FIG. 1, and a video cassette recorder (VCR) 80 as a signal source device is connected to the audio-visual receiver 20.

The remote controller 10 recognizes the audio-visual receiver 20, the display device 30, the DVD player 40, and the VCR 80 as the remotely controlled devices, and is capable of remotely controlling these remotely controlled devices by carrying out a remote control processing for transmitting remote control codes to the remotely controlled devices. There are four remote control modes of the remote controller 10 including: the audio-visual receiver mode for remotely controlling the audio-visual receiver 20, the display mode for remotely controlling the display device 30, the DVD mode for remotely controlling the DVD player 40, and a VCR mode for remotely controlling the VCR 80. According to the remote controller 10 of this embodiment, with the user operating in a predetermined manner, it is possible to change a signal source device that is remotely controlled through the macro-control operation. In the following, the remote controller 10 is described in detail with reference to FIG. 13 to FIG. 18.

Figure 13:
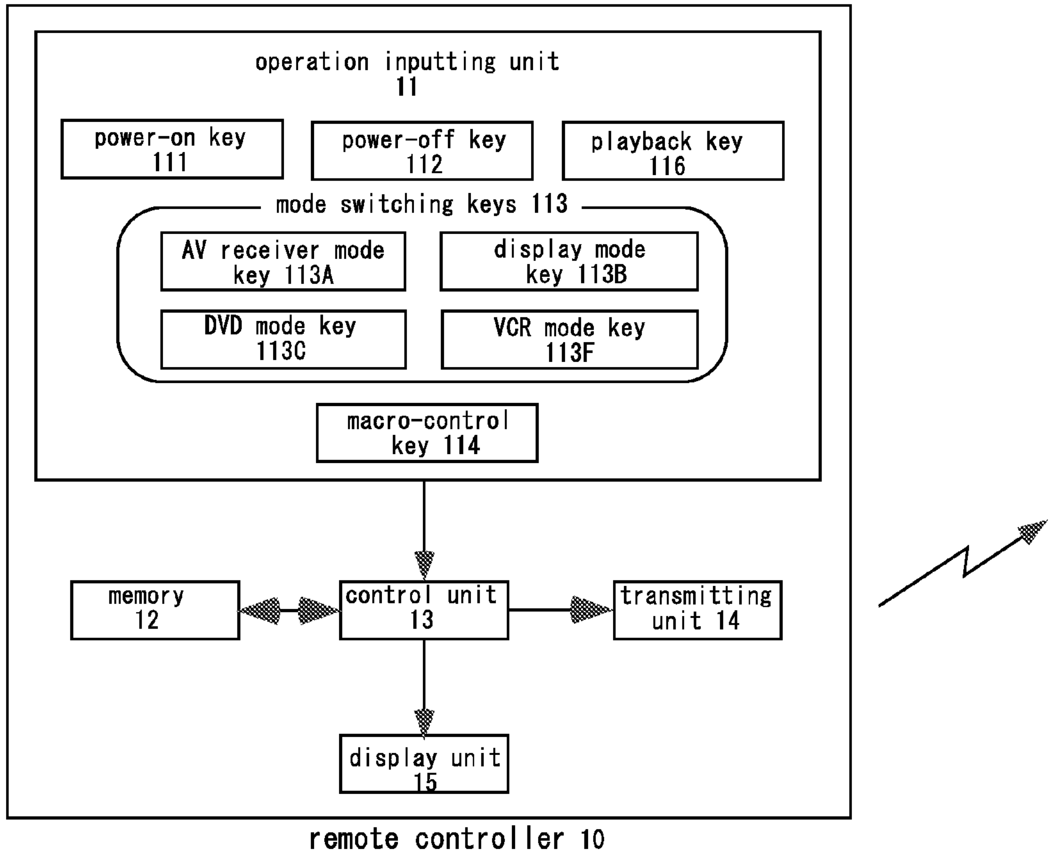
FIG. 13 shows a block diagram illustrating the remote controller.

FIG. 13 shows a block diagram illustrating a configuration of the remote controller 10. The transmitting unit 14 and the display unit 15 are as described with reference to FIG. 2. The operation inputting unit 11 includes, as the operation keys, the power-on key 111 for turning on power of the remotely controlled devices, the power-off key 112 for turning off power of the remotely controlled devices, a playback key 116 for causing the remotely controlled devices to start a playback operation, mode switching keys 113 for switching between the remote control modes, and a macro-control key 114 for macro-controlling to carry out the plurality of remote control operations to one or more of the remotely controlled devices with a single key operation.

The operation inputting unit 11 includes, as the mode switching keys 113, the audio-visual receiver mode key 113A for setting the remote controller 10 to the audio-visual receiver mode, the display mode key 113B for setting the remote controller 10 to the display mode, the DVD mode key 113C for setting the remote controller 10 to the DVD mode, and a VCR mode key 113F for setting the remote controller 10 to the VCR mode. The DVD mode key 113C also servers as an operation key for switching the input selector of the audio-visual receiver 20 so as to switch the signal source device to the DVD player 40 (hereinafter referred to as 'switching the input selector to the "DVD"'). The VCR mode key 113F also servers as an operation key for switching the input selector of the audio-visual receiver 20 so as to switch the signal source device to the VCR 80 (hereinafter referred to as 'switching the input selector to the "VCR"').

In this embodiment, the macro-control key 114 is initially configured as a key for macro-controlling the audio-visual receiver 20, the display device 30, and the DVD player 40 when watching movies. Specifically, the macro-control key

114 is initially configured as a macro-control key for turning on power of the audio-visual receiver 20, the display device 30, and the DVD player 40, switching the input selector of the audio-visual receiver 20 to the "DVD", and causing the DVD player 40 to start a playback operation. Further, when the macro-control key 114 is operated in a predetermined manner along with the DVD mode key 113C or the VCR mode key 113F, a signal source device that is macro-controlled by the macro-control key 114 is changed to a signal source device that corresponds to this mode switching key 113. For example, when the macro-control key 114 and the VCR mode key 113F are operated at the same time, a signal source device that is remotely controlled by the macro-control key 114, is changed to the VCR 80 form the DVD player 40 as initially configured. When the macro-control key 114 and the DVD mode key 113C are operated at the same time, a signal source device that is remotely controlled by the macro-control key 114 is changed to the DVD player 40.

The memory 12 stores the macro-control process sequence associated with the macro-control key 114. FIG. 14 shows the macro-control process sequence. The macro-control process sequence is such that the key codes for the display mode key, the power-on key, the signal source device mode key (the DVD mode key or the VCR mode key), the power-on key, the audio-visual receiver mode key, the power-on key, the signal source device mode key (the DVD mode key or the VCR mode key), and the playback key are registered in order. In this embodiment, the key code for the DVD mode key is initially configured as the key code for the signal source device mode key, and the DVD player 40 is set as the signal source device that is remotely controlled by the macro-control key 114 (FIG. 15).

When the macro-control key 114 is operated, the control unit 13 carries out either a remote control processing in the same manner as in a case in which operation keys that correspond to the key codes registered to the macro-control process sequence are operated in the registered order or a predetermined remote control processing (macro-control process). Further, when the macro-control key 114 and the mode switching key 113 are operated in a predetermined manner, the control unit 13 changes a signal source device to be remotely controlled by the macro-control key 114 to a signal source device that corresponds to the operated mode switching key 113 (macro-control modification process).

Figure 16:
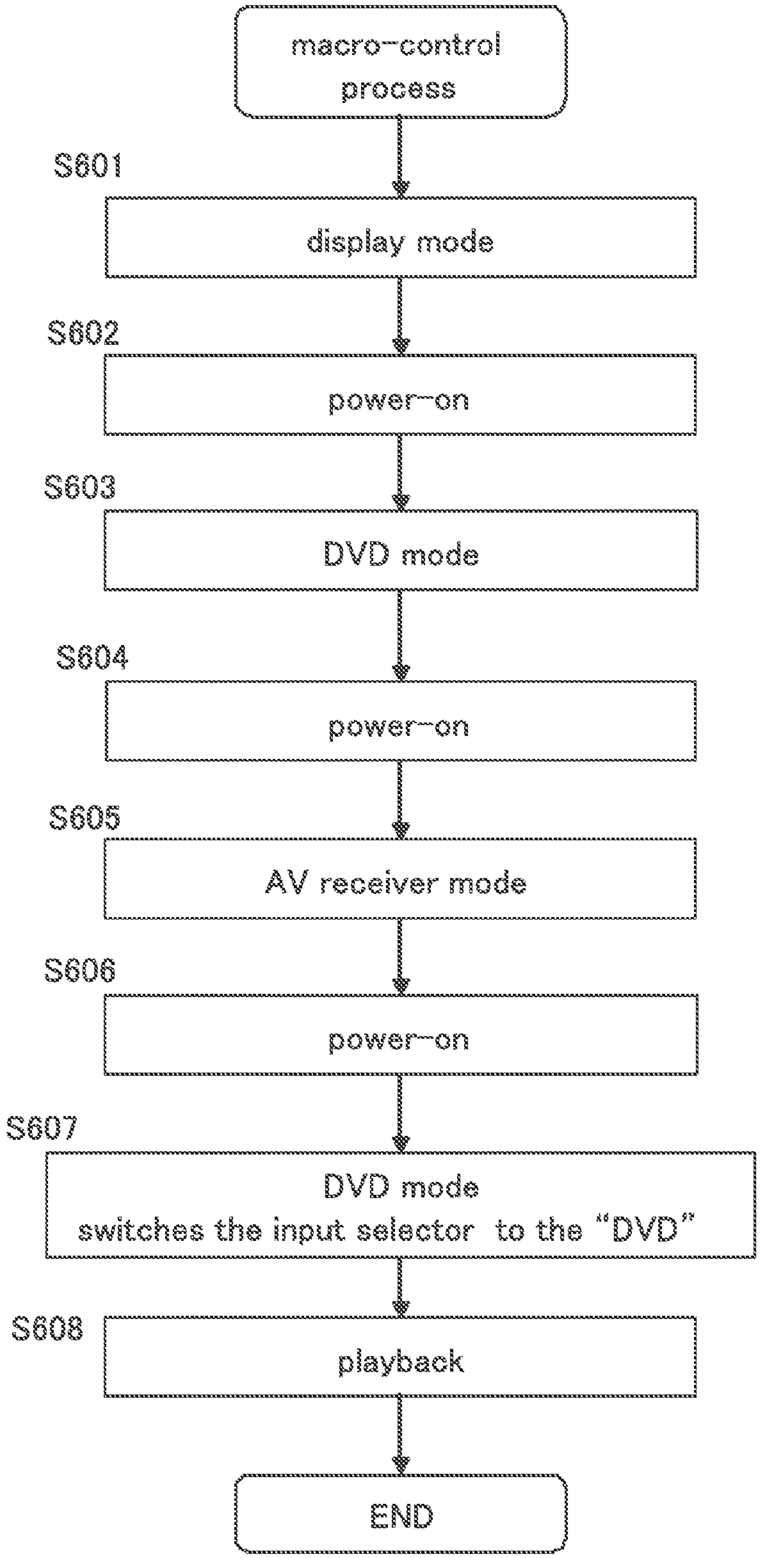
FIG. 16 shows a flow chart of the macro-control process.

Next, the macro-control process carried out by the control unit 13 when the macro-control key 114 is operated is described. FIG. 16 shows a flow chart of the macro-control process carried out by the control unit 13 when the macro-control key 114 is operated. When the macro-control key 114 is operated, the control unit 13 refers to the macro-control process sequence, and carries out either a remote control processing in the same manner as in a case in which the display mode key 113B, the power-on key 111, the DVD mode key 113C, the power-on key 111, the audio-visual receiver mode key 113A, the power-on key 111, a DVD key 115A, the DVD mode key 113C, and the playback key 116 are operated in the stated order or the predetermined remote control processing. Specifically, the control unit 13 carries out the process for switching the remote control mode to the display mode (S601). Then, the control unit 13 carries out the power-on process (S602). Specifically, as the remote control mode is set to the display mode in step S601, the control unit 13 reads the remote control code for turning on power of the display device 30 from the memory 12, outputs the code to the transmitting unit 14, and causes the code to be transmitted from the transmitting unit 14. Subsequently, the control unit 13 carries out the process for switching the remote control mode to the DVD mode (S603). In step S603, as the remote control processing is based on the key code for the DVD mode key 113C, it is configured to carry out only the mode switching process where both the mode switching process and the switching process of the input selector of the audio-visual receiver 20 are to be carried out. Then, the control unit 13 carries out the power-on process (S604). Specifically, as the remote control mode is set to the DVD mode in step S603, the control unit 13 reads the remote control code for turning on power of the DVD player 40 from the memory 12, outputs the code to the transmitting unit 14, and causes the code to be transmitted from the transmitting unit 14. Next, the control unit 13 carries out the process for switching the remote control mode to the audio-visual receiver mode (S605). Then, the control unit 13 carries out the power-on process (S606). Specifically, as the remote control mode is set to the audio-visual receiver mode in step S605, the control unit 13 reads the remote control code for turning on power of the audio-visual receiver 20 from the memory 12, outputs the code to the transmitting unit 14, and causes the code to be transmitted from the transmitting unit 14. Thereafter, the control unit 13 switches the input selector of the audio-visual receiver 20 to the "DVD", and carries out the process for switching the remote control mode to the DVD mode (S607). Then, the control unit 13 carries out a playback process (S608). Specifically, as the remote control mode is set to the DVD mode in step S607, the control unit 13 reads the remote control code for causing the DVD player 40 to start the playback operation from the memory 12, outputs the code to the transmitting unit 14, and causes the code to be transmitted from the transmitting unit 14.

Figure 17:
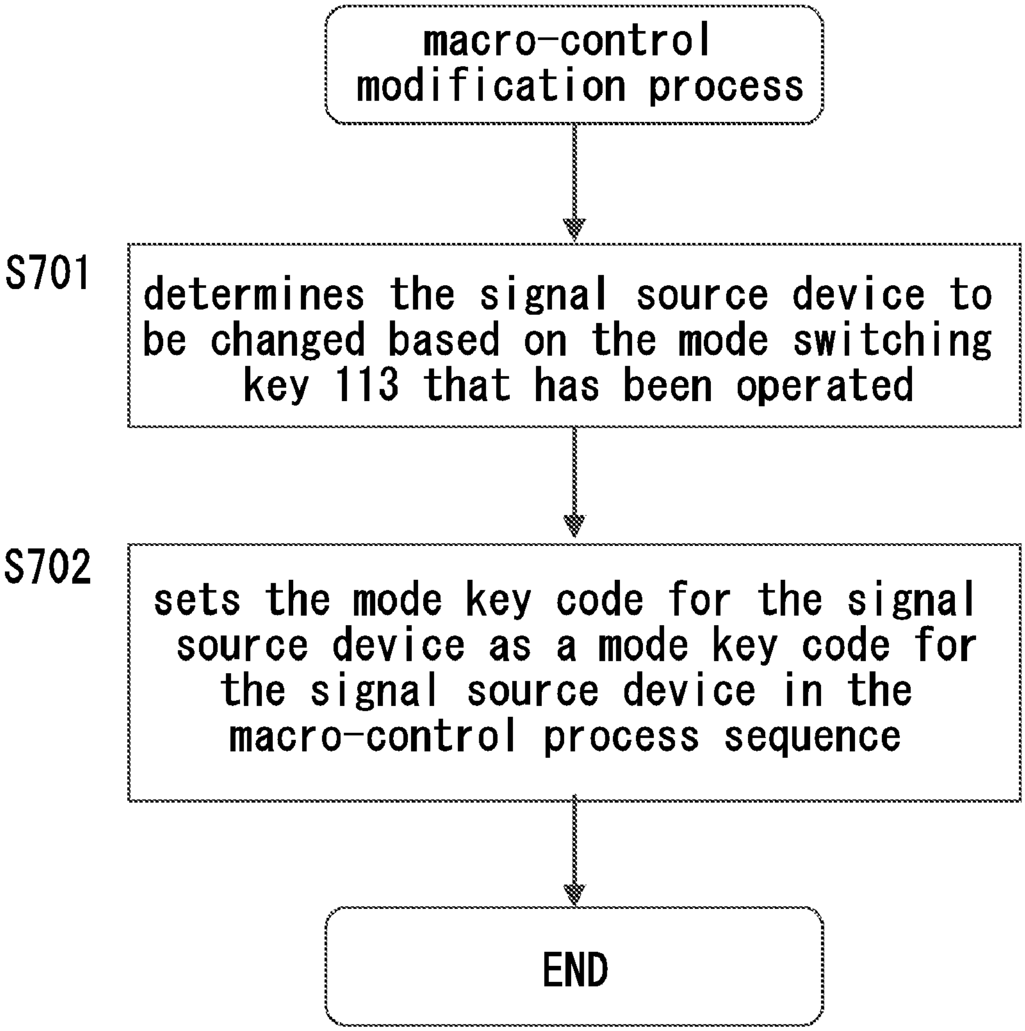
FIG. 17 shows a flow chart of a macro-control modification process.

Next, the macro-control modification process is specifically described. FIG. 17 shows a flow chart of the macro-control modification process of the control unit 13. FIG. 18 shows a macro-control process sequence in the macro-control modification process. If the user wishes to change the signal source device that is macro-controlled by the macro-control key 114 from the DVD player 40 to another signal source device, the user operates the macro-control key 114 and the mode switching key 113 that corresponds to the signal source device at the same time. When the macro-control key 114 and the mode switching key 113 are operated the same time, the control unit 13 determines the signal source device to be changed based on the mode switching key 113 that has been operated (S701). Then, the control unit 13 sets the mode key code for the signal source device as a mode key code for the signal source device in the macro-control process sequence (S702). Specifically, when the macro-control key 114 and the VCR mode key 113F are operated at the same time, the control unit 13 determines the signal source device to be remotely controlled through the macro-control operation is to be changed to the VCR 80, and changes the mode key code for the signal source device in the macro-control process sequence to the key code for the VCR mode key 113F (FIG. 18). In the power-on process based on the key code for the power-on key 111 and the playback process based on the key code for the playback key 116, the remotely controlled device whose remote control code is to be transmitted is determined according to the remote control mode of the remote controller 10, and therefore the control unit 13 can change the signal source device to be remotely controlled through the macro-control operation only by changing the mode key code for the signal source device in the macro-control process sequence. When the macro-control key 114 is operated after content of the macro-control operation is modified through the macro-control modification process, the VCR 80, instead of the DVD player 40, is turned on, and the playback operation is started. At this time, the input selector for the audio-visual receiver 20 is switched to the "VCR".

As described above, the user can easily change the signal source device to be remotely controlled through the macro-control operation only by operating the macro-control key 114 and the mode switching key 113 that corresponds to the signal source device in the predetermined manner. Utilizing the mode switching key 113 to select the signal source device to change eliminates necessity of additionally providing operation keys for selecting a signal source device to change, and the user can change the signal source device to be remotely controlled through the macro-control operation with the same feeling as the operation of switching the input selector of the audio-visual receiver 20 by the mode switching key 113 (or the operation of switching the remote control mode of the remote controller 10). Further, even when the signal source device is connected to the input selector of the audio-visual receiver 20 and such, the user is able to macro-control the signal source device using a macro-control operation button 115 by operating the macro-control key 114 and the mode switching key 113 associated with the signal source device in the predetermined manner.

Figure 19:
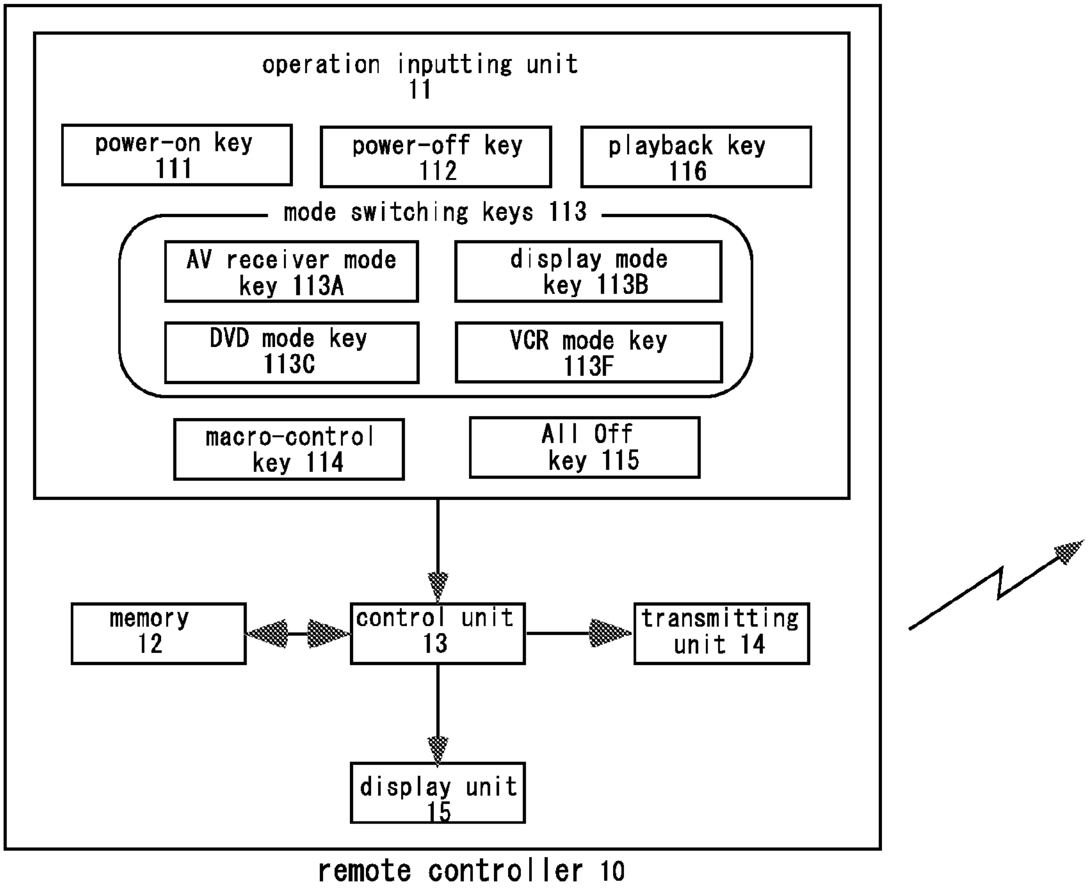
FIG. 19 shows a block diagram illustrating the remote controller.

Next, a yet another different preferred embodiment according to the present invention is specifically described with reference to FIG. 19 to FIG. 23. FIG. 19 shows a block diagram illustrating a configuration of the remote controller 10 of the yet another different preferred embodiment according to the present invention. The remote controller 10 is further provided with an all-off macro-control operation function for turning off power of the plurality of remotely controlled devices at the same time, and is different from the remote controller 10 illustrated in FIG. 13 in that the operation unit 11 is further provided with the "All Off" key 115 as a macro-control key for turning off power of the remotely controlled devices that are turned on through the macro-control operation by the macro-control key 114.

The memory 12 stores the all-off operation process sequence associated with the "All Off" key 115. The all-off operation process sequence is as described with reference to FIG. 6. In this embodiment, the macro-control process sequence is initially configured with the DVD mode key as the mode key for the signal source device (FIG. 20).

When the "All Off" key 115 is operated, the control unit 13 carries out the process for turning off power of the remotely controlled devices that have been turned on through the macro-control operation by the macro-control key 114 (all-off operation process). Further, when the signal source device that is to be remotely controlled is changed through the macro-control operation, the control unit 13 also changes the signal source device that is to be turned off through the all-off operation process. Specifically, in the macro-control modification process that is carried out when the macro-control key 114 and the mode switching key 113 are operated in the predetermined manner, the control unit 13 changes the signal source device that is to be turned off by the all-off key 115 to the signal source device that corresponds to the operated mode switching key 113.

Figure 21:
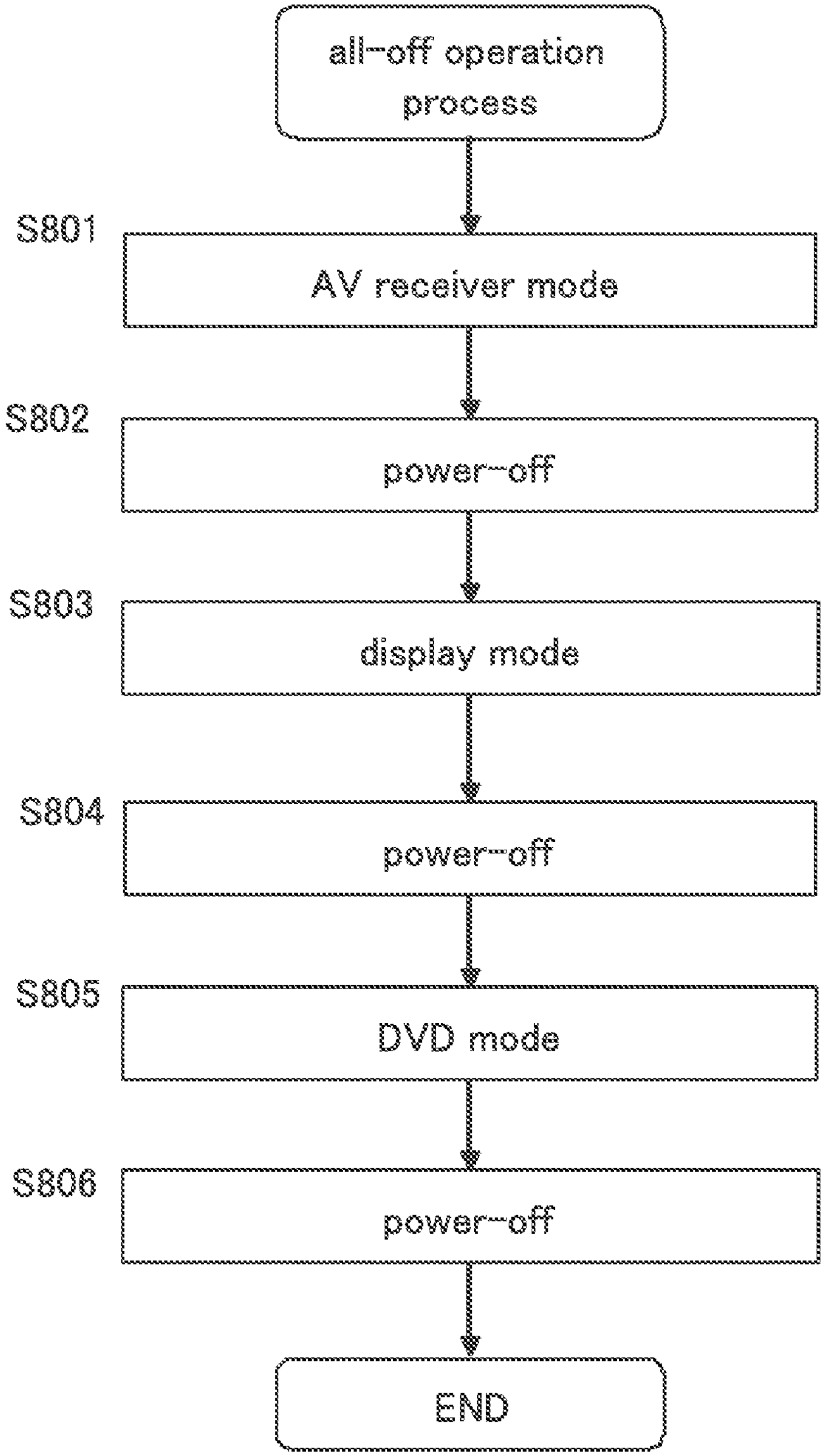
FIG. 21 shows a flow chart of the all-off operation process.

Next, the all-off operation process carried out by the control unit 13 when the "All Off" key 115 is operated is described. FIG. 21 shows a flowchart of the all-off operation process carried out by the control unit 13 when the "All Off" key 115 is operated. When the "All Off" key 115 is operated, the control unit 13 carries out the remote control processing in the same manner as in a case in which operation keys that correspond to the key codes registered to the all-off operation process sequence are operated in the registered order. That is, in the all-off operation process sequence, the control unit 13 carries out a remote control processing in the same manner as in a case in which the audio-visual receiver mode key, the power-off key, the display mode key, the power-off key, the mode key for the signal source device (the DVD mode key or the VCR mode key), and the power-off key are operated in the stated order. Specifically, when the "All Off" key 115 is operated, the control unit 13 carries out the process for switching the remote control mode to the audio-visual receiver mode (S801). Then, the control unit 13 carries out the power-off process (S802). Specifically, as the remote control mode is set to the audio-visual receiver mode in step S801, the control unit 13 reads the remote control code for turning off power of the audio-visual receiver 20 from the memory 12, outputs the code to the transmitting unit 14, and causes the code to be transmitted from the transmitting unit 14. Next, the control unit 13 carries out the process for switching the remote control mode to the display mode (S803). Then, the control unit 13 carries out the power-off process (S804). Specifically, as the remote control mode is set to the display mode in step S803, the control unit 13 reads the remote control code for turning off power of the display device 30 from the memory 12, outputs the code to the transmitting unit 14, and causes the code to be transmitted from the transmitting unit 14. Next, the control unit 13 carries out the process for switching the remote control mode to the DVD mode (S805). In step S803, as the remote control processing is based on the key code for the DVD mode key 113C, it is configured to carry out only the mode switching process where the switching process of the input selector of the mode switching process and the audio-visual receiver 20 are to be carried out. Then, the control unit 13 carries out the power-off process (S806). Specifically, as the remote control mode is set to the DVD mode in step S805, the control unit 13 reads the remote control code for turning off power of the DVD player 40 from the memory 12, outputs the code to the transmitting unit 14, and causes the code to be transmitted from the transmitting unit 14.

Figure 22:
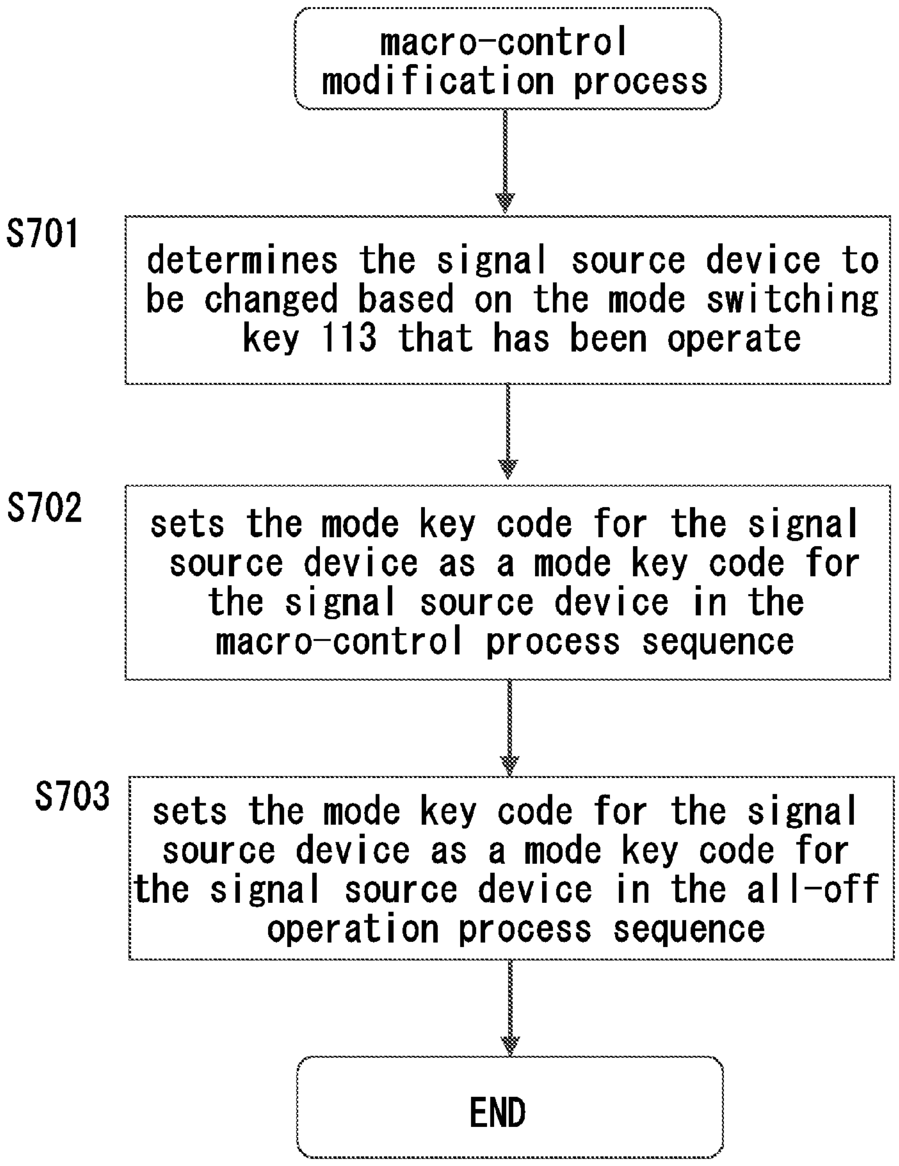
FIG. 22 shows a flow chart of the macro-control modification process.

The following describes the macro-control modification process carried out by the control unit 13 when the macro-control key 114 and the mode switching key 113 are operated in the predetermined manner. FIG. 22 shows a flow chart of the macro-control modification process of the control unit 13. FIG. 23 shows an all-off operation process sequence in the macro-control modification process. If the user wishes to change the signal source device that is macro-controlled by the macro-control key 114 from the DVD player 40 to another signal source device, the user operates the macro-control key 114 and the mode switching key 113 that corresponds to the desired signal source device at the same time. When the macro-control key 114 and the mode switching key 113 are operated the same time, the control unit 13 determines the signal source device to be changed based on the mode switching key 113 that has been operated, in the same manner as in the above described macro-control modification process, and sets the mode key code for the signal source device as a mode key code for the signal source device in the macro-control process sequence (S701 and S702). Further, the control unit 13 sets the mode key code for the signal source device as a mode key code for the signal source device in the all-off operation process sequence (S703). Specifically, when the macro-control key 114 and the VCR mode key 113F are operated the same time, the control unit 13 changes the mode key code for the signal source device in the all-off operation process sequence to the key code for the VCR mode key 113F (FIG. 22). In the power-off process based on the key code for the power-off key 112, the remotely controlled device whose remote control code is to be transmitted is determined according to the remote control mode of the remote controller 10, and therefore it is possible to change the signal source device to be remotely controlled through the macro-control operation only by changing the mode key code for the signal source device in the macro-control process sequence. With this, the signal source device that is to be turned off when the "All Off" key 115 is operated is the VCR 80.

As described above, according to the remote controller 10 having the all-off macro-control operation function, when the signal source device that is macro-controlled by the macro-control key is changed, the signal source device that is to be turned off by the all-off operation is also changed. The signal source device to be changed is determined, as similarly to the macro-control modification process described previously, based on the mode switching key 113 that is operated together with the macro-control key 114.

While the macro-control modification process is explained to be carried out when the macro-control key 114 and the mode switching key 113 are pressed at the same time, the present invention is not limited to such an example. For example, the remote controller 10 can be shifted to a mode for modifying the macro-control operation by the macro-control key 114 by a long press operation of the macro-control key 114, and the signal source device to be remotely controlled by the macro-control key 114 can be changed by the mode switching key 113 that is operated subsequently.

Further, while the signal source devices connected to the audio-visual receiver 20 are explained only as the DVD player 40 and the VCR 80, the present invention is not limited to such an example, and can include a different signal source device that outputs video and audio, for example, the CD player, the set-top box for cable television, the radio tuner, and such.

Moreover, while the macro-control process sequence and the all-off operation process sequence are explained to include the key code for turning on and off power of the display device 30, it is not necessary to turn on and off power of the display device 30 when the signal source device is the CD player, the radio tuner, and such. In this case, the macro-control process sequence and the all-off operation process sequence may not include the key code for turning on and off power of the display device 30. Further, when the playback operation is not included as a function as in the case of the set-top box for cable television, the key code for starting the playback operation may not be included the macro-control process sequence.

Further, according to the remote controller having the all-off macro-control operation function, the control unit 13 carries out the macro-control modification process when the macro-control key 114 and the mode switching key 113 are operated in the predetermined manner. However, the control unit 13 can carry out the macro-control modification process when the "All Off" key 115 instead of the macro-control key 114 together with the mode switching key 113 is operated in the predetermined manner.

Moreover, while the DVD mode key 113C and the VCR mode key 113F also serve as the operation keys for switching the input selector of the audio-visual receiver 20, in addition to switching the remote control mode of the remote controller 10, an input selector key can be additionally provided as the operation key for switching the input selector of the audio-visual receiver 20 for the operation inputting unit 11 of the remote controller 10 (for example, a DVD key for switching the input selector to the DVD player 40 and a VCR key for switching the input selector to the VCR 80), and the control unit 13 can carry out the macro-control modification process when the input selector key and the macro-control key 114 are operated in the predetermined manner. In this case, the control unit 13 determines the signal source device to be changed based on the operated input selector.

Although the preferred embodiments according to the present invention are described in the above, the present invention is not limited to these embodiments.

What is claimed is:

1. A remote controller comprising:

at least one first input unit that macro-controls predetermined remotely controlled devices including signal source devices;

a plurality of second input units that select the signal source devices;

a memory unit that stores a plurality of remote control codes for remotely controlling the remotely controlled devices;

a transmitting unit that externally transmits the remote control codes; and a control unit that, when the first input unit is operated, outputs the remote control codes for remotely controlling the plurality of remotely controlled devices to the transmitting unit, and causes the transmitting unit to externally transmit the codes, wherein when the first input unit and one of the second input units are operated in a predetermined manner, the signal source device to be remotely controlled by the first input unit is changed to the signal source device that has been selected by the operated one of the second input units.

2. The remote controller according to claim 1, wherein said memory unit further stores a macro-control process sequence that is associated with said first input unit, the macro-control process sequence including key codes for operation keys for remotely controlling said remotely controlled devices in a predetermined order, and said control unit:

when said first input unit is operated, carries out one of a remote control processing carried out in the same manner as in a case in which operation keys corresponding to the key codes included in the macro-control process sequence that is associated with the operated first input unit are operated, and a predetermined remote control processing, and when the first input unit and the one of said second input units are operated in the predetermined manner, changes a key code in the macro-control process sequence for remotely controlling said signal source device to a key code for remotely controlling the signal source device that has been selected by the operated one of the second input units.

3. The remote controller according to claim 1, further comprising:

a third input unit that turns off power of said remotely controlled devices that have been turned on through a macro-control operation by said first input unit, wherein said control unit:

when the third input unit is operated, outputs the remote control codes for turning off power of the remotely controlled devices that have been turned on through the macro-control operation by the first input unit to the transmitting unit, and causes the transmitting unit to externally transmit the codes, and when one of the first input unit and the third input unit is operated together with the second input unit in the predetermined manner, changes the signal source device to be turned off by the third input unit to the signal source device that has been selected by the operated one of the second input units.

4. The remote controller according to claim 1 used in an audio-visual system including an audio-visual amplifier as one of said remotely controlled devices, the audio-visual amplifier having an input selector for selecting one of the signal source devices to which one of an audio signal and a video signal is inputted, wherein said second input units are operation keys for switching the input selector of the audio-visual amplifier, and the signal source devices selected by the second input units are associated with the operation keys.

5. A remote controller comprising:

a plurality of first input units that turns on power of a plurality of remotely controlled devices;

a second input unit that turns off power of the plurality of remotely controlled devices;

a memory unit that stores a plurality of remote control codes for remotely controlling the remotely controlled devices;

a transmitting unit that externally transmits the remote control codes; and a control unit that outputs the remote control codes to the transmitting unit and causes the transmitting unit to externally transmit the codes, wherein the control unit:

when any of the plurality of first input units is operated, outputs remote control codes for turning on power of predetermined remotely controlled devices associated with the operated first input unit to the transmitting unit, and causes the transmitting unit to externally transmit the codes, and when the second input unit is operated, outputs remote control codes for turning off power of the remotely controlled devices that have been turned on by the first input unit that has been operated last time to the transmitting unit, and causes the transmitting unit to externally transmit the codes.

6. The remote controller according to claim 5, wherein said memory unit further stores macro-control process sequences that are associated with said first input units, each macro-control process sequence including key codes for operation keys in a predetermined order, the operation keys being for remotely controlling said remotely controlled devices, and said control unit:

when any of said first input unit is operated, carries out one of a remote control processing in the same manner as in a case in which the operation keys corresponding to the key codes included in the macro-control process sequence that is associated with the operated first input unit are operated, and a predetermined remote control processing, and when said second input unit is operated, turns off power of the remotely controlled devices whose key codes for turning on power of the remotely controlled devices are included in the macro-control process sequence that is associated with said last operated first input unit.

7. The remote controller according to claim 6, wherein when said macro-control process sequence associated with said last operated first input unit is modified after an operation of the sequence, said control unit, when said second input unit is operated, turns off power only of predetermined remotely controlled devices regardless of the macro-control process sequence associated with the last operated first input unit.

* * * * *